US012503689B2

(12) United States Patent
Chen et al.

(10) Patent No.: US 12,503,689 B2
(45) Date of Patent: Dec. 23, 2025

(54) MODIFIED KLENOW FRAGMENT AND APPLICATION THEREOF

(71) Applicant: GeneMind Biosciences Company Limited, Guangdon (CN)

(72) Inventors: Qingbin Chen, Guangdong (CN); Weiyue Chen, Guangdong (CN); Hongdan Li, Guangdong (CN); Xia Lin, Guangdong (CN); Wen Wang, Guangdong (CN); Weiwei Luo, Guangdong (CN); Lei Sun, Guangdong (CN)

(73) Assignee: GeneMind Biosciences Company Limited, Guangdong (CN)

( * ) Notice: Subject to any disclaimer, the term of this patent is extended or adjusted under 35 U.S.C. 154(b) by 675 days.

(21) Appl. No.: 17/776,490

(22) PCT Filed: Sep. 10, 2020

(86) PCT No.: PCT/CN2020/114356
§ 371 (c)(1),
(2) Date: May 12, 2022

(87) PCT Pub. No.: WO2021/093434
PCT Pub. Date: May 20, 2021

(65) Prior Publication Data
US 2022/0411767 A1    Dec. 29, 2022

(30) Foreign Application Priority Data

Nov. 13, 2019 (CN) .......................... 201911103369.4
Nov. 15, 2019 (CN) .......................... 201911120490.8

(51) Int. Cl.
*C12N 9/12* (2006.01)
*C12Q 1/6869* (2018.01)

(52) U.S. Cl.
CPC .......... *C12N 9/1252* (2013.01); *C12Q 1/6869* (2013.01); *C12Y 207/07007* (2013.01)

(58) Field of Classification Search
CPC ................ C12N 9/1252; C12Q 1/6869; C12Y 207/07007
See application file for complete search history.

(56) References Cited

U.S. PATENT DOCUMENTS 5,614,365 A * 3/1997 Tabor .................. C12N 9/1252
435/488
2007/0178489 A1    8/2007 Astatke et al.

FOREIGN PATENT DOCUMENTS

| CN | 1170439 A | 1/1998 |
|----|-----------|--------|
| CN | 111534500 A | 8/2020 |
| EP | 0727496 A2 | 8/1996 |
| EP | 0727496 A3 | 9/2000 |
| WO | 2006/037064 A2 | 4/2006 |
| WO | 2012/097318 A2 | 7/2012 |

OTHER PUBLICATIONS

Shinkai and Loeb, "In Vivo Mutagenesis by Escherichia coli DNA Polymerase I." Journal of Biological Science. 276:46759-46764 (Year: 2001).*
Mohan et al., "DNA Binding Domain of *Escherichia coli* DNA Polymerase I: Identificaiton of Arginine-841 as an Essential Residue." Biochemistry. 27: 226-233. (Year: 1988).*
"PolyHis tag: how length matters in protein purification." Marvelgent Biosciences. downloaded Mar. 4, 2025 from <https://marvelgent.com/blogs/marvoblog/how-his-tag-length-matters-in-protein-purification>. (Year: 2018).*
Siloto and Weselake, ", BiocatalySite saturation mutagenesis: Methods and applications in protein engineering," Biocatalysis and Agricultural Biotechnolog, 181-189. (Year: 2012).*
Astatke et al., "A single side chain prevents *Escherichia coli* DNA polymerase I (Klenow fragment) from incorporating ribonucleotides," *Proc. Natl. Acad. Sci. USA* 95:3402-3407 (1998).
GenBank: EFN5731753.1, DNA polymerase 1 [*Escherichia coli*], 2 pages, May 8, 2020.
NCBI Reference Sequence: WP_075861667.1, DNA polymerase 1 [*Escherichia coli*], 2 pages, Jun. 1, 2019.
NCBI Reference Sequence: WP_152028965.1, Multispecies: DNA polymerase 1 [Enterobacteriaceae], 2 pages, Jan. 21, 2021.
CAS Registry No. 1246898-80-5, Oct. 22, 2010, 1 page.
Derbyshire et al., "Genetic and Crystallographic Studies of the 3',5'-Exonucleolytic Site of DNA Polymerase I," *Science* 240:199-201, Apr. 1988.
Thompson et al., "Determinants of DNA Mismatch Recognition within the Polymerase Domain of the Klenow Fragment," *Biochemistry* 41:713-722, 2002.

* cited by examiner

*Primary Examiner* — Suzanne M Noakes
*Assistant Examiner* — Ciara A Mcknight
(74) *Attorney, Agent, or Firm* — Seed IP Law Group LLP

(57) ABSTRACT

Provided are a modified Klenow fragment and an application thereof; specifically provided is a modified Klenow fragment, wherein at least one position or functionally equivalent position among F762, A842, I709 and P603 in the amino acid sequence of the modified Klenow fragment contains at least one amino acid substitution mutation. The modified Klenow fragment has higher DNA polymerase activity than a wild-type Klenow fragment and can be applied to sequencing.

19 Claims, 9 Drawing Sheets

Specification includes a Sequence Listing.

MODIFIED KLENOW FRAGMENT AND APPLICATION THEREOF

CROSS REFERENCE TO RELATED APPLICATIONS

The present application claims priority and benefit to Chinese Patent Application No. CN201911103369.4 filed with China National Intellectual Property Administration on Nov. 13, 2019 and Chinese Patent Application No. CN201911120490.8 filed with China National Intellectual Property Administration on Nov. 15, 2019, each of which is incorporated herein by reference in its entirety.

STATEMENT REGARDING THE SEQUENCE LISTING

The Sequence Listing associated with this application is provided in text format in lieu of a paper copy, and is hereby incorporated by reference into the specification. The name of the text file containing the Sequence Listing is 260085_415USPC_SEQUENCE_LISTING. The text file is 2202 bytes, was created on May 10, 2022, and is being submitted electronically via EFS-Web.

TECHNICAL FIELD

The present application relates to the field of molecular biology. In particular, the present application relates to a modified Klenow fragment and use thereof.

BACKGROUND

Klenow enzyme, also referred to as Klenow fragment or Klenow large fragment, is the fragment with larger molecular weight of two fragments obtained by treating DNA polymerase I from *E. coli* with subtilisin or trypsin. The Klenow fragment retains the 5'-3' polymerase activity and the 3'-5' exonuclease activity of DNA polymerase I but lacks the 5'-3' exonuclease activity, and is normally used to fill-in the single-stranded ends of DNA. Besides, exo-Klenow fragment, a mutant of the Klenow fragment, is also normally used in tests. It is a Klenow fragment with no exonuclease activity and is normally referred to as the Klenow fragment (3'->5' exo-).

The Klenow or exo-Klenow fragment can be used for polymerization/amplification at 37° C. Therefore, amplification using the Klenow or exo-Klenow fragment has a relatively low temperature control requirement on experimental apparatus and the like. In addition, the Klenow or exo-Klenow fragment has small molecular weight relative to DNA polymerase I, which makes it relatively easy to synthesize a corresponding nucleic acid sequence for constructing an expression vector and facilitates preparation and industrial application.

The amplification effect of the Klenow or exo-Klenow fragment is associated with the properties of the polymerase itself, including synthesis capacity, fidelity/proofreading capacity, specificity/enzyme activity and stability, and also associated with the reaction environment, including reaction conditions, such as sequencing buffer, nucleotide species, surface structure of solid medium (adsorption of enzyme). The Klenow fragment is rarely used in the amplification platforms including sequencing platforms on the market nor modified probably because of the absence of resistance to high temperature and its low polymerization capacity or relatively poor overall performance.

Improving or adjusting the performance of the Klenow fragment in a certain aspect is beneficial in increasing its industrial practicability.

SUMMARY

The inventors conducted tests using a wild-type Klenow fragment and a commercially available Klenow fragment kit and found that: the wild-type Klenow fragment or a common mutant exo-Klenow fragment thereof does not yield a better result in nucleic acid sequence amplification, especially in sequencing; when these enzymes are used in nucleotide extension such as sequencing, the resulting measures of the sequencing such as the sequencing average read length and the amount of effective data are all not ideal; furthermore, the wild-type Klenow fragment and exo-Klenow fragment show relatively poor performance in sequencing compared to the commercially available Klenow fragment.

The present application aims to solve at least one of the above technical problems to at least some extent.

To this end, in a first aspect, the present application provides an modified Klenow fragment having an amino acid sequence comprising at least one amino acid substitution mutation at at least one of positions F762, A842, I709 and P603, or at a functionally equivalent position thereto. Here, the positions of the amino acids in the amino acid sequence of the modified Klenow fragment are numbered based on DNA polymerase I (UniPRotKB accession No.: P00582, uniPRot.org/uniPRot/P00582). For example, F762 indicates that the F (phenylalanine) at position 762 in the amino acid sequence of the modified Klenow fragment corresponding to the amino acid sequence of DNA polymerase I is mutated.

In some examples, the amino acid substitution mutation is selected from at least one of the substitution mutations functionally equivalent to F762Y, A842K, A842H, A842R, I709K, I709H, I709R and P603K. In some examples, for example, missense mutations of the modified Klenow fragment are any of the following 1)-14): 1) F762Y; 2) A842K; 3) I709K; 4) F762Y and A842K; 5) F762Y, A842K and P603K; 6) A842K and I709K; 7) F762Y and I709K; 8) F762Y, A842K and I709K; 9) A842H and I709K; 10) A842K and I709H; 11) A842H and I709H; 12) A842R and I709K; 13) A842K and I709R; 14) A842R and I709R. In some other examples, the modified Klenow fragment is an enzyme mix, such as a mixture of the above modified Klenow fragments involving two or more of 1)-14).

The modified Klenow fragment provided in this aspect of the present application has high synthesis capacity, including high synthesis speed and/or high affinity for a substrate, and shows, when used in sequencing, high compatibility with modified nucleotides and/or growing DNA strands, which is favorable to the obtainment of longer read lengths and/or the increase in proportion of high quality data.

Regarding the nomenclature of mutations, the rules established by the Human Genome Variation Society (HGVS mutation nomenclature) recognized in the art are used herein. For example, p.Trp26Cys indicates that Trp at position 26 is substituted with Cys with a protein as a reference sequence; unless otherwise specified, all the mutations referred to herein are amino acid mutations, the reference sequence is a protein, and "p." is omitted in all written descriptions of these mutations.

It can be understood that mutations of the same function may be expressed differently. For example, based on different types of reference sequences, such as genomic DNA and protein, the same mutation may be expressed differently. For another example, with part or all of the same protein as a reference sequence, a mutation position may be numbered differently. Based on information on a specific reference sequence, those skilled in the art are able to know and identify identical mutations at the same functional position in different representations including representations with different position numbers, and such modified Klenow fragments with the same mutations as those provided in this aspect of the present application in different representations belong to the modified Klenow fragments referred to in this aspect of the present application.

To visually demonstrate the performance of the modified Klenow fragment provided by the inventors after mutation, testing and repeated screening and verification, in some examples, the modified Klenow fragment(s) and commercialized Klenow fragments were separately employed in sequencing, and the results were compared, the commercialized Klenow enzymes including the Klenow fragment of NEB™ (NEB™, Cat. #M0407B) and the Klenow fragment of VAZYME™ (VAZYME™, Cat. #N105-C1); in addition, the modified Klenow fragment(s) were tested experimentally for their properties and compared to the wild-type Klenow fragment.

The wild-type Klenow fragment is the same to the general wild type, which refers to the most common type in the natural population relative to the mutant type. In some examples, in order to facilitate the preparation of a Klenow fragment with a known sequence introduced at the end of the wild-type amino acid sequence that does not affect the reaction performance of the enzyme, the Klenow fragment with a known sequence is also referred to as the wild-type or tagged wild-type Klenow fragment. In some examples, in order to facilitate the preparation of an modified Klenow fragment with a known sequence that does not affect the reaction performance of the enzyme introduced at the end of the amino acid sequence of the modified Klenow fragment, the modified Klenow fragment with a known sequence is also referred to as an modified Klenow fragment or a tagged modified Klenow fragment or a tagged mutant Klenow fragment.

The sequencing refers to a process in which a nucleotide with a detectable signal is linked to an end of a nucleotide fragment using the reaction performance of a Klenow fragment and the type of the linked nucleotide or base is determined according to the detected type of the detectable signal, the detectable signal including a fluorescent signal, such as Cy5 or Cy3.

In the description of the properties, as well as the effect obtained when used in sequencing, of the enzyme referred to hereinafter, unless otherwise stated, the BRR (base repeat ratio) refers to the proportion of repeated bases, namely, the ratio of the number of bases corresponding to a certain position to be detected where consecutive signals or those of one type are detected to the total number of bases. This term is defined base on the fact that it is rare for a normal sequence to contain multiple consecutively repeated bases. For example, it is rare for a normal sequence to contain one or more sequences of 5 or more consecutively repeated bases. The determination of the value of the term defined can reflect to some extent the possibility of the measured data being objective/true. Sequencing generally involves multiple cycles so that a sequence of a specific length (read) can be determined, with one completion of base extensions of four nucleotides defined as one cycle. In some examples, four nucleotides are added in two or more batches to the reaction system to achieve one cycle, that is, one cycle comprises multiple base extensions (repeats). For a normal sequence, in N (a natural number greater than 2, for example, 8) consecutive base extensions, it is highly unlikely that a reaction signal is generated or a base/nucleotide can be read at a certain position in each extension. If a base/nucleotide is read at the position consecutively 8 times, it is more likely that nucleotide adsorption or nucleotide-polymerase complex adsorption occurs at the position and thus reaction signals are detected at the position in 8 consecutive base extensions. Typically, the consecutively detected reaction signals are all directed to the same base. In other examples, four nucleotides are simultaneously added to the reaction system to achieve one cycle, that is, one cycle comprises one base extension. For a normal sequence, in N (a natural number greater than 2, for example, 6) consecutive base extension reactions, when identical signals are detected at a position consecutively 6 times or a 6 bp sequence of repeated bases is called, it is more likely that nucleotide adsorption or nucleotide-polymerase complex adsorption occurs at the position and thus identical signals are consecutively generated than that the 6 bp sequence of repeated bases is actually present in the sequence to be detected. Regarding the calculation of BRR, in some examples, for example, N is set to 8, and if in a certain sequencing, the total number of bases/nucleotides called is 1000 and three sequences of no less than 8 consecutively repeated bases, e.g., three sequences comprising 8, 10 and 9 bases respectively, are called, the corresponding BRR will be (8+10+9)/1000. Generally, the lower the BRR, the less the adsorption.

In one example, the modified Klenow fragment has an amino acid sequence comprising a substitution mutation functionally equivalent to F762Y. The Klenow fragment comprising mutation F762Y (e.g., the Klenow fragment numbered PR1 in the embodiment) has significantly higher DNA polymerase activity than the wild-type Klenow fragment (e.g., the Klenow fragment numbered PR0 in the embodiment), with the polymerase activity of PR1 being 1.62 times or more that of PR0 in multiple tests. PR1 shows comparable or superior sequencing results in a $Mn^{2+}$-containing solution to those of the Klenow fragments of NEB™ and VAZYME™ with unknown mutation sites, with the average read length obtained by sequencing using PR1 being 1.17 times and 1.36 times those obtained using the latter two enzymes.

In one example, the modified Klenow fragment has an amino acid sequence comprising substitution mutations functionally equivalent to F762Y and A842K. The Klenow fragment comprising mutations F762Y and A842K (e.g., the Klenow fragment numbered PR5 in the embodiment) has improved DNA polymerase activity relative to the wild-type Klenow fragment PR0, with the DNA polymerase activity of PR5 being 1.29 times that of PR0 in multiple tests. Comparisons of the sequencing results of PR5 and PR1 and the Klenow fragment of VAZYME™ show that and the average read length obtained by sequencing using PR5 is 0.96 times and 1 times those obtained using the latter two enzymes, respectively, and the BRR (base repeat ratio) in the sequencing results is reduced compared to those obtained using the latter two enzymes.

In one example, the modified Klenow fragment has an amino acid sequence comprising substitution mutations functionally equivalent to F762Y and I709K. The Klenow fragment comprising mutations F762Y and I709K (e.g., the Klenow fragment numbered PR8 in the embodiment) has improved DNA polymerase activity relative to the wild-type Klenow fragment PR0, with the DNA polymerase activity of PR8 being 1.33 times that of PR0 in multiple tests. The sequencing results of PR8 in a $Mg^{2+}$-containing buffer is compared with those of the Klenow fragment of VAZYME™, showing comparable average read lengths obtained. However, the sequencing read lengths stagnate at short fragments when PR8 is used in sequencing in a $Mn^{2+}$-containing solution.

In one example, the modified Klenow fragment has an amino acid sequence comprising substitution mutations functionally equivalent to F762Y, A842K and P603K. The Klenow fragment comprising mutations F762Y, A842K and P603K (e.g., the Klenow fragment numbered PR6 in the embodiment) has improved DNA polymerase activity relative to the wild-type Klenow fragment PR0, with the DNA polymerase activity of PR6 being 1.33 times that of PR0 in multiple tests. A comparison of the sequencing results of PR6 and the Klenow fragment of VAZYME™ shows that: the sequencing read lengths stagnate at short fragments when PR6 is used in sequencing in a $Mg^{2+}$-containing buffer, the average read length obtained by sequencing using PR6 in a $Mn^{2+}$-containing buffer is comparable to that obtained using the Klenow fragment of VAZYME™, and the BRR of the sequencing result of PR6 is 0.82 times that of the Klenow fragment of VAZYME™.

In one example, the modified Klenow fragment has an amino acid sequence comprising substitution mutations functionally equivalent to F762Y, A842K and I709K. The Klenow fragment comprising mutations F762Y, A842K and I709K (e.g., the Klenow fragment numbered PR9 in the embodiment) has significantly improved DNA polymerase activity relative to the wild-type Klenow fragment PR0, with the DNA polymerase activity of PR9 being 1.67 times that of PR0 in multiple tests. A comparison of the sequencing results of PR9 and the Klenow fragment of VAZYME™ shows that: the sequencing read lengths stagnate at short fragments when PR9 is used in sequencing in a $Mn^{2+}$-containing buffer, sequencing can be effectively performed in a $Mg^{2+}$-containing buffer, and however, the average read length obtained by sequencing is shorter than that obtained using the Klenow fragment of VAZYME™.

In one example, the modified Klenow fragment has an amino acid sequence comprising a substitution mutation functionally equivalent to A842K or A842H or A842R, and the amino acid after the substitution is a basic amino acid. The Klenow fragment comprising mutation A842K (e.g., the Klenow fragment numbered PR2 in the embodiment) has improved DNA polymerase activity relative to the wild-type Klenow fragment PR0, with the DNA polymerase activity of PR2 being 1.05 times that of PR0 in multiple tests. It shows better sequencing effect in a $Mn^{2+}$-containing buffer than the Klenow fragment of NEB™ and the Klenow fragment of VAZYME™, with the average sequencing read length is 1.03 times and 1.04 times those of the latter two enzymes, respectively, and the sequencing effect in a $Mn^{2+}$-containing buffer is better than that in a $Mg^{2+}$-containing buffer.

In one example, the modified Klenow fragment has an amino acid sequence comprising substitution mutations functionally equivalent to A842K and 1709, wherein the substitution mutation 1709 may be I709K or I709H or I709R. The Klenow fragment comprising mutations A842K and I709K (e.g., the Klenow fragment numbered PR7 in the embodiment) has improved DNA polymerase activity relative to the wild-type Klenow fragment PR0, with the DNA polymerase activity of PR7 being 1.43 times that of PR0 in multiple tests. The average read length obtained by sequencing using PR7 is 1.15 times that obtained using the Klenow fragment of VAZYME™; PR7 shows a lower BRR in the sequencing result than the Klenow fragment of VAZYME™ and PR3. Under conditions of different buffers, PR7 has different amplification capacities, with the best amplification capacity in the presence of $Mg^{2+}$ and a reduced amplification capacity in the presence of $Mn^{2+}$ and the absence of $Mg^2$, and the sequencing read lengths stagnate at short fragments; besides, amplification can be effectively performed using PR7 in the simultaneous presence of $Mn^2$ and $Mg^2$, with the average read length obtained by sequencing being greater than that obtained using the Klenow fragment of VAZYME™.

In one example, the modified Klenow fragment has an amino acid sequence comprising a substitution mutation functionally equivalent to I709K. The Klenow fragment comprising mutation I709K (e.g., the Klenow fragment numbered PR3 in the embodiment) has significantly improved DNA polymerase activity relative to the wild-type Klenow fragment PR0, with the DNA polymerase activity of PR3 being 1.67 times that of PR0 in multiple tests. The average read length obtained by sequencing using PR3 is comparable to that obtained using the Klenow fragment from NEB™, with the former being 1.01 times the latter. PR3 is effective in reducing the BRR. In the sequencing results, the BRR of PR3 is 0.65 times that of the Klenow fragment from NEB™. In sequencing using PR3 in a $Mn^{2+}$-containing buffer, the sequencing read lengths extensively stagnate at short fragments.

In one example, the modified Klenow fragment has an amino acid sequence comprising a substitution mutation functionally equivalent to P603K. The Klenow fragment comprising mutation P603K (e.g., the Klenow fragment numbered PR4 in the embodiment) has significantly improved DNA polymerase activity relative to the wild-type Klenow fragment PR0, with the DNA polymerase activity of PR4 being 1.24 times that of PR0 in multiple tests. PR4 shows better sequencing effect in a $Mn^2$-containing buffer than in a $Mg^2$-containing buffer. The average read length obtained by sequencing using PR4 in buffer I stagnates at short fragments, the average read length obtained by sequencing using PR4 in a $Mn^2$-containing buffer is comparable to that obtained using the Klenow fragment of VAZYME™, and the BRRs in the sequencing results of the two enzymes are comparable. The average read length obtained by sequencing using PR4 in a $Mn^{2+}$-containing buffer is 1.07 times that obtained using the Klenow fragment of VAZYME™.

In one example, the modified Klenow fragment has an amino acid sequence comprising substitution mutations functionally equivalent to C907A and/or substitution mutations functionally equivalent to D355A and E357A.

In one example, at least one end of the amino acid sequence of the modified Klenow fragment described above has a known sequence of less than 12 amino acids (12aa), which may be located at the C-terminus or N-terminus of the amino acid sequence of the Klenow fragment. In the present application, the known sequence is located at the N-terminus of the amino acid sequence of the Klenow fragment. The known sequence does not affect the activity of the Klenow fragment, and the added known sequence contains 6-10 histidine residues, such as GSSHHHHHHSSG (SEQ ID NO:1) and HHHHHHHHH (SEQ ID NO:7). The combination reaction of histidine (H) in the known sequence and Ni in a Ni-containing purification column is used to purify proteins containing this tag. In the present application, N's small molecules glycine and serine with flexible structures are added to the N-terminus and C-terminus of the known sequence, so that the effect of the known sequence on the activity of the Klenow fragment can be effectively reduced.

In a second aspect, the present application provides a nucleic acid molecule encoding the modified Klenow fragment provided in the first aspect of the present application. Various nucleotide codons may be possible for an amino acid mutation site. For example, a tyrosine codon may be TAT and/or TAC, and a lysine codon may be AAA and/or AAG. The corresponding nucleotide sequence of the non-mutated Klenow fragment site is identical to that of 324-928aa of DNA polymerase I (UniPRotKB: P00582).

In a third aspect, the present application provides an expression vector comprising the nucleic acid molecule provided in the second aspect of the present application. The vector can be used for the preservation of a nucleotide fragment of interest, such as pET-28a and related series of vectors.

In a fourth aspect, the present application provides a host cell comprising the expression vector provided in the third aspect of the present application. Host cells can be used to express vector proteins, such as E. coli cell BL21.

In a fifth aspect, the present application provides use of the modified Klenow fragment provided in the first aspect of the present application in extension of a nucleic acid sequence including experiments such as conventional PCR, nucleic acid sequencing and DNA end-filling, wherein DNA refers to deoxyribonucleic acid strands, including cDNA. Compared to the wild-type Klenow fragment, the modified Klenow fragment has improved polymerase activity and is well compatible with a sequencing system, so that effective sequencing can be performed, and thus the sequencing quality is improved; for example, the average read length obtained by sequencing is increased.

In a sixth aspect, the present application provides a method for incorporating nucleotides into DNA, which comprises interaction among (a) any of the modified Klenow fragments according to the first aspect of the present application or a mixture thereof, (b) DNA and (c) a nucleotide solution, wherein nucleotides in the nucleotide solution are nucleotides or nucleotide analogues modified with a fluorescent molecule, such as the nucleotide disclosed in PCT/CN2018/118259 or the nucleotide suitable for two sequencing platforms disclosed by Illumina™, preferably the nucleotide disclosed in PCT/CN2018/118259 or a nucleotide with a similar structure thereto. The binding in the present application refers to the linking of nucleotides to an end of a nucleotide sequence using the polymerase activity of the modified Klenow fragment.

The modified Klenow fragment cannot be used for effective amplification in a conventional Klenow amplification solution during sequencing. There are suitable nucleotide solutions for the modified Klenow fragment, wherein the nucleotide solution contains $Mg^{2+}$ and/or $Mn^2$. In one example, when the modified Klenow fragment used in the method of incorporating nucleotides into DNA is the Klenow fragment numbered PR2, PR3, PR7, PR8 or PR9 in the embodiment, the nucleotide solution contains $Mg^{2+}$ but does not contain $Mn^{2+}$, and the $Mg^{2+}$ has a concentration of 5-10 mM; when the modified Klenow fragment used in the method of incorporating nucleotides into DNA is the Klenow fragment numbered PR1, PR2, PR4, PR5 or PR6 in the embodiment, the nucleotide solution contains $Mn^{2+}$ but does not contain $Mg^{2+}$, and the $Mn^{2+}$ has a concentration of 0.1-5 mM; when the modified Klenow fragment used in the method of incorporating nucleotides into DNA is the Klenow fragment numbered PR7 in the embodiment, the nucleotide solution contains $Mg^{2+}$ and $Mn^{2+}$, wherein the $Mg^{2+}$ has a concentration of 5-10 mM, and the $Mn^{2+}$ has a concentration of 0.1-5 mM.

In the sixth aspect, the present application provides a kit for incorporating nucleotides into DNA, which comprises at least one of the modified Klenow fragments provided in the first aspect of the present application.

In one example, the kit comprises an modified Klenow fragment (e.g., PR1) comprising a substitution mutation functionally equivalent to F762Y and a nucleotide solution, wherein the nucleotide solution contains nucleotides labeled with a fluorescent molecule and 0.1-5 mM $Mn^{2+}$ but does not contain $Mg^{2+}$.

In one example, the kit comprises an modified Klenow fragment (e.g., PR5) comprising substitution mutations functionally equivalent to F762Y and A842K and a nucleotide solution, wherein the nucleotide solution contains nucleotides labeled with a fluorescent molecule and 5-10 mM $Mg^{2+}$ but does not contain $Mn^{2+}$.

In one example, the kit comprises an modified Klenow fragment (e.g., PR8) comprising substitution mutations functionally equivalent to I709K and F762Y and a nucleotide solution, wherein the nucleotide solution contains nucleotides labeled with a fluorescent molecule and 5-10 mM $Mg^{2+}$ but does not contain $Mn^{2+}$.

In one example, the kit comprises an modified Klenow fragment (e.g., PR6) comprising substitution mutations functionally equivalent to F762Y, A842K and P603K and a nucleotide solution, wherein the nucleotide solution contains nucleotides labeled with a fluorescent molecule and 0.1-5 mM $Mn^{2+}$ but does not contain $Mg^{2+}$.

In one example, the kit comprises an modified Klenow fragment (e.g., PR9) comprising substitution mutations functionally equivalent to F762Y, A842K and I709K and a nucleotide solution, wherein the nucleotide solution contains nucleotides labeled with a fluorescent molecule and 5-10 mM $Mg^{2+}$ but does not contain $Mn^{2+}$.

In one example, the kit comprises an modified Klenow fragment (e.g., PR2) comprising a substitution mutation functionally equivalent to A842K or A842H or A842R and a nucleotide solution, wherein the nucleotide solution contains nucleotides labeled with a fluorescent molecule and 5-10 mM $Mg^{2+}$ but does not contain $Mn^{2+}$ $^{2+}$ or the nucleotide solution contains nucleotides labeled with a fluorescent molecule and 0.1-5 mM $Mn^{2+}$ but does not contain $Mg^{2+}$.

In one example, the kit comprises an modified Klenow fragment (e.g., PR7) comprising substitution mutations functionally equivalent to A842K and I709K, or to A842H and I709K, and a nucleotide solution, wherein the nucleotide solution contains nucleotides labeled with a fluorescent molecule and 5-10 mM $Mg^{2+}$ and 0.1-5 mM $Mn^{2+}$ or the nucleotide solution contains nucleotides labeled with a fluorescent molecule and 5-10 mM $Mg^{2+}$ but does not contain $Mn^{2+}$.

In one example, the kit comprises an modified Klenow fragment (e.g., PR3) comprising a substitution mutation functionally equivalent to I709K and a nucleotide solution, wherein the nucleotide solution contains nucleotides labeled with a fluorescent molecule and 5-10 mM $Mg^{2+}$ but does not contain $Mn^{2+}$ In one example, the kit comprises an modified Klenow fragment (e.g., PR4) comprising a substitution mutation functionally equivalent to P603K and a nucleotide solution, wherein the nucleotide solution contains nucleotides labeled with a fluorescent molecule and 0.1-5 mM $Mn^{2+}$ but does not contain $Mg^{2+}$.

In a seventh aspect, the present application provides use of the kit described above in extension of a nucleic acid sequence including experiments such as conventional PCR, nucleic acid sequencing and DNA end-filling, wherein DNA refers to a deoxyribonucleic acid strand, including cDNA.

The modified Klenow fragment provided in any of aspects or embodiments of the present application has higher DNA polymerase activity than the wild-type Klenow fragment, and thus can significantly improve the efficiency of polymerization.

The sequencing effect of the modified Klenow fragment provided in any of aspects or embodiments of the present application is improved in different aspects to different extents relative to the Klenow fragment of the commercial kit. For example, the average read length is increased, and the BRR is reduced.

In addition, it should be noted that, in some examples, the modified Klenow fragment provided in any of the aspects or embodiments of the present application described above shows a preference for different reaction conditions. For example, some modified Klenow fragments, such as a Klenow fragment comprising mutation P603K, are more suitable for amplification in a buffer in which only the catalytic ion $Mn^{2+}$ exists. For another example, some modified Klenow fragments, such as a Klenow fragment comprising mutations A842K and I709K, are suitable for amplification in a buffer containing the catalytic ion $Mg^{2+}$ as well as a buffer containing both the catalytic ions $Mg^{2+}$ and $Mn^{2+}$.

DETAILED DESCRIPTION

Figure 1:
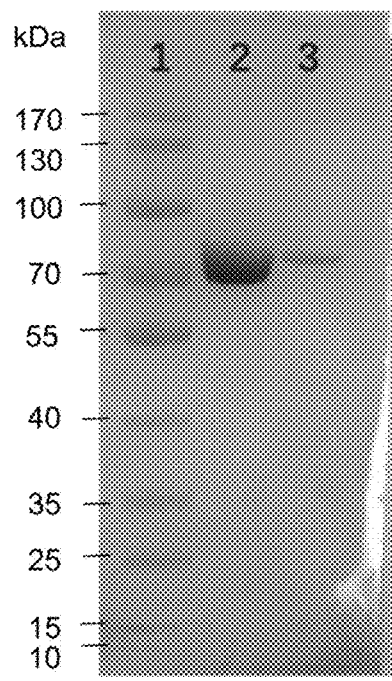
FIG. 1 shows an SDS-PAGE electropherogram of an wild-type Klenow fragment PR0: in lanes 1, 2 and 3 are a protein molecule marker, PR0 purified by step 2, and a 20-fold dilution of PR0 purified by step 2, respectively.
Figure 2:
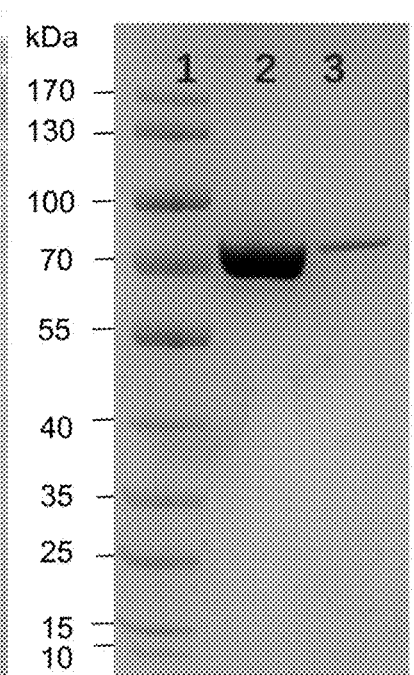
FIG. 2 shows an SDS-PAGE electropherogram of an modified Klenow fragment PR1: in lanes 1, 2 and 3 are a protein molecule marker, PR1 purified by step 2, and a 20-fold dilution of PR1 purified by step 2, respectively.
Figure 3:
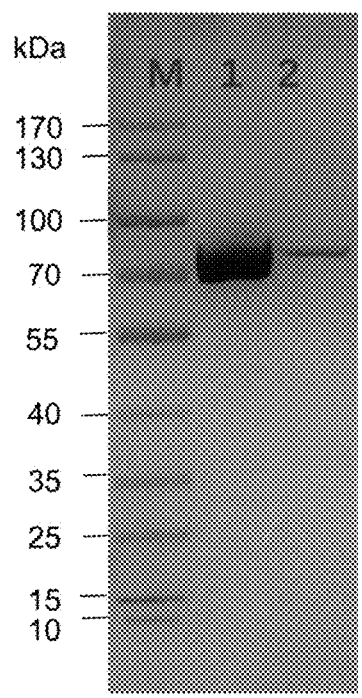
FIG. 3 shows an SDS-PAGE electropherogram of an modified Klenow fragment PR2: in lanes M, 1 and 2 are a protein molecule marker, PR2 purified by step 2, and a 20-fold dilution of PR2 purified by step 2, respectively.
Figure 4:
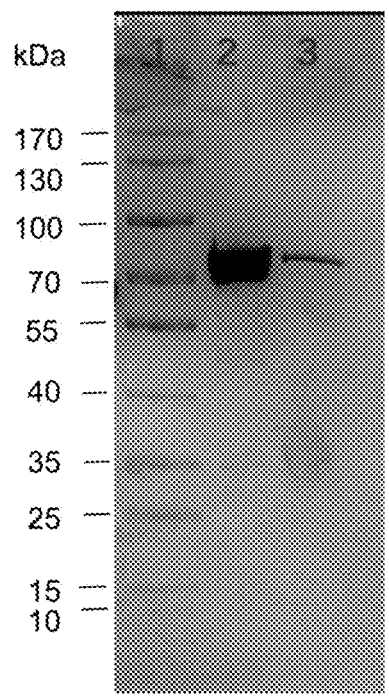
FIG. 4 shows an SDS-PAGE electropherogram of an modified Klenow fragment PR3: in lanes 1, 2 and 3 are a protein molecule marker, PR3 purified by step 2, and a 20-fold dilution of PR3 purified by step 2, respectively.
Figure 5:
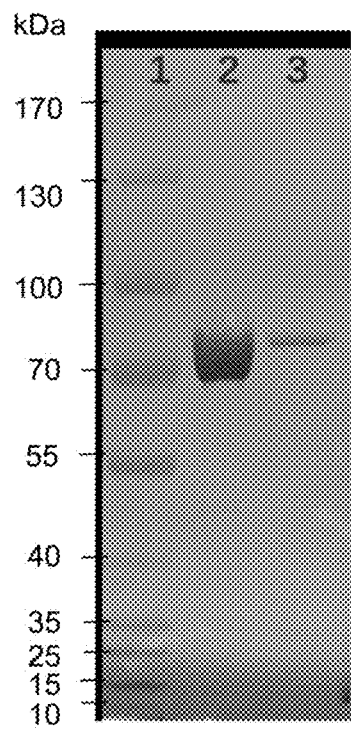
FIG. 5 shows an SDS-PAGE electropherogram of an modified Klenow fragment PR4: in lanes 1, 2 and 3 are a protein molecule marker, PR4 purified by step 2, and a 20-fold dilution of PR4 purified by step 2, respectively.
Figure 6:
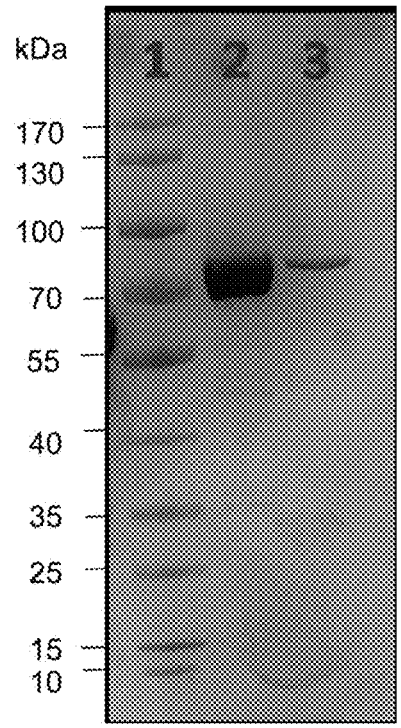
FIG. 6 shows an SDS-PAGE electropherogram of an modified Klenow fragment PR5: in lanes 1, 2 and 3 are a protein molecule marker, PR5 purified by step 2, and a 20-fold dilution of PR5 purified by step 2, respectively.
Figure 7:
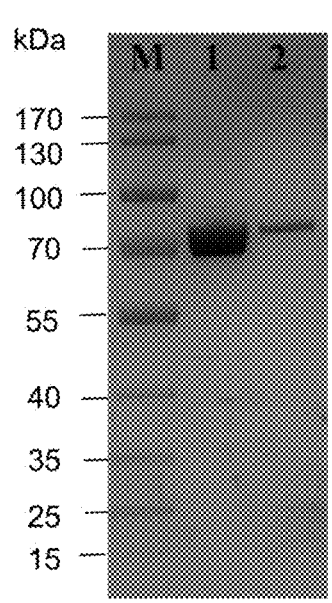
FIG. 7 shows an SDS-PAGE electropherogram of an modified Klenow fragment PR6: in lanes M, 1 and 2 are a protein molecule marker, PR6 purified by step 2, and a 20-fold dilution of PR6 purified by step 2, respectively.
Figure 8:
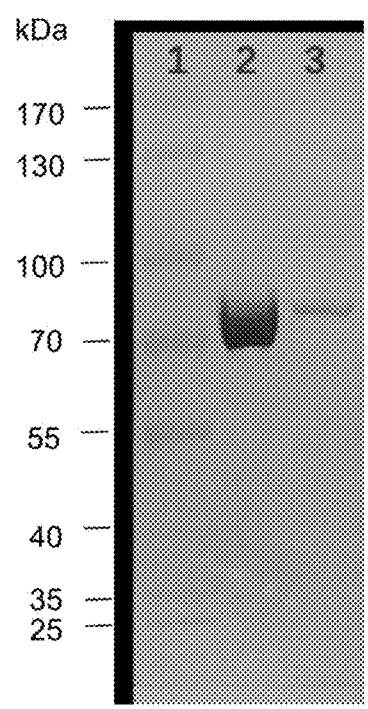
FIG. 8 shows an SDS-PAGE electropherogram of an modified Klenow fragment PR7: in lanes 1, 2 and 3 are a protein molecule marker, PR7 purified by step 2, and a 20-fold dilution of PR7 purified by step 2, respectively.
Figure 9:
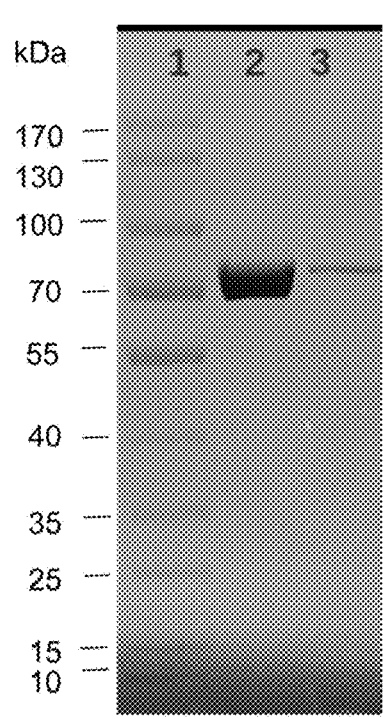
FIG. 9 shows an SDS-PAGE electropherogram of an modified Klenow fragment PR8: in lanes 1, 2 and 3 are a protein molecule marker, PR8 purified by step 2, and a 20-fold dilution of PR8 purified by step 2, respectively.
Figure 10:
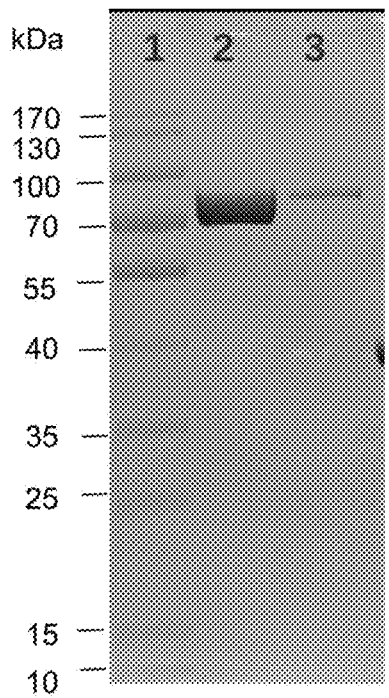
FIG. 10 shows an SDS-PAGE electropherogram of an modified Klenow fragment PR9: in lanes 1, 2 and 3 are a protein molecule marker, PR9 purified by step 2, and a 20-fold dilution of PR9 purified by step 2, respectively.
Figure 11:
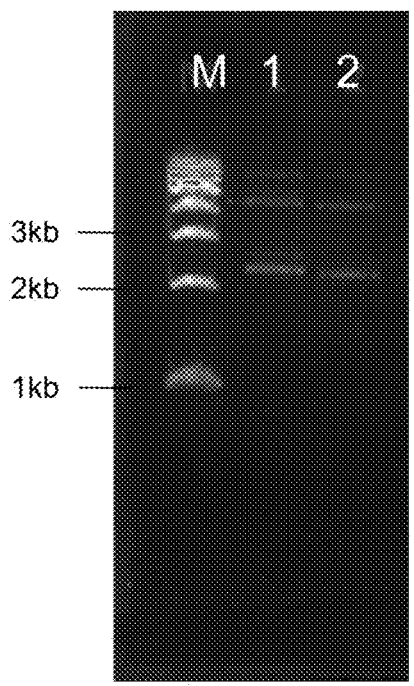
FIG. 11 shows a gel electropherogram for endonuclease activity assay of PR0: in lanes M, 1 and 2 are a DNA molecule marker, a negative control, and PR0, respectively.
Figure 12:
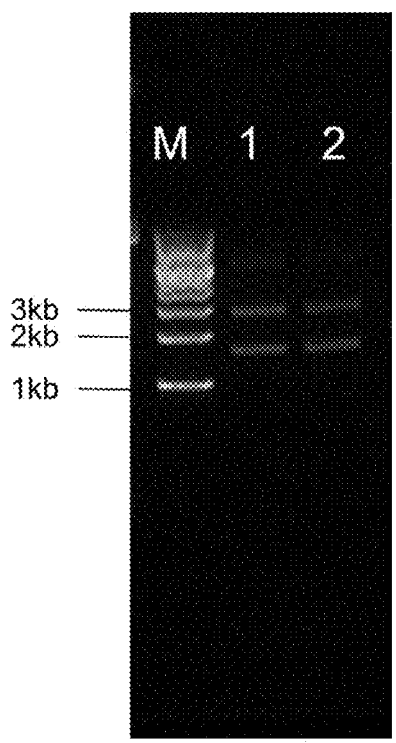
FIG. 12 shows a gel electropherogram for endonuclease activity assay of the modified Klenow fragment PR1: in lanes M, 1 and 2 are a DNA molecule marker, a negative control, and PR1, respectively.
Figure 13:
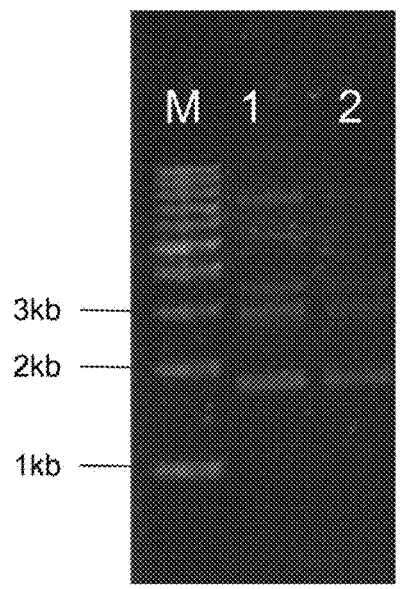
FIG. 13 shows a gel electropherogram for endonuclease activity assay of the modified Klenow fragment PR2: in lanes M, 1 and 2 are a DNA molecule marker, a negative control, and PR2, respectively.
Figure 14:
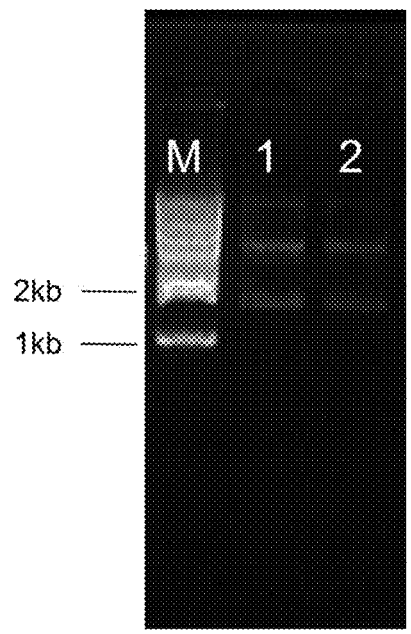
FIG. 14 shows a gel electropherogram for endonuclease activity assay of the modified Klenow fragment PR3: in lanes M, 1 and 2 are a DNA molecule marker, a negative control, and PR3, respectively.
Figure 15:
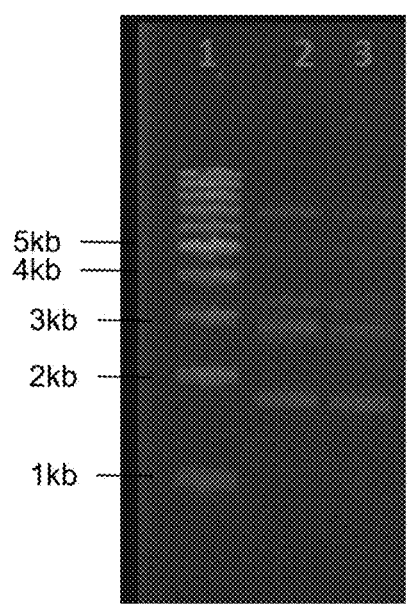
FIG. 15 shows a gel electropherogram for endonuclease activity assay of the modified Klenow fragment PR4: in lanes 1, 2 and 3 are a DNA molecule marker, a negative control, and PR4, respectively.
Figure 16:
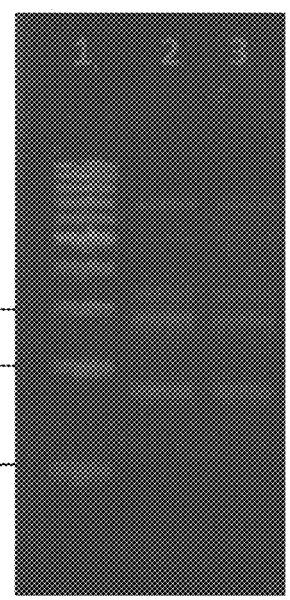
FIG. 16 shows a gel electropherogram for endonuclease activity assay of the modified Klenow fragment PR5: in lanes 1, 2 and 3 are a DNA molecule marker, a negative control, and PR5, respectively.
Figure 17:
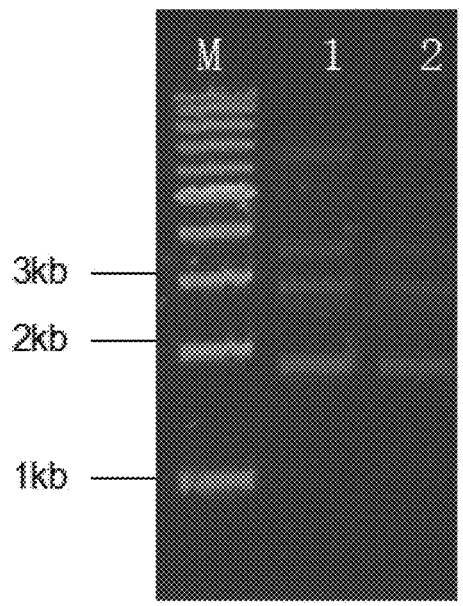
FIG. 17 shows a gel electropherogram for endonuclease activity assay of the modified Klenow fragment PR6: in lanes M, 1 and 2 are a DNA molecule marker, a negative control, and PR6, respectively.
Figure 18:
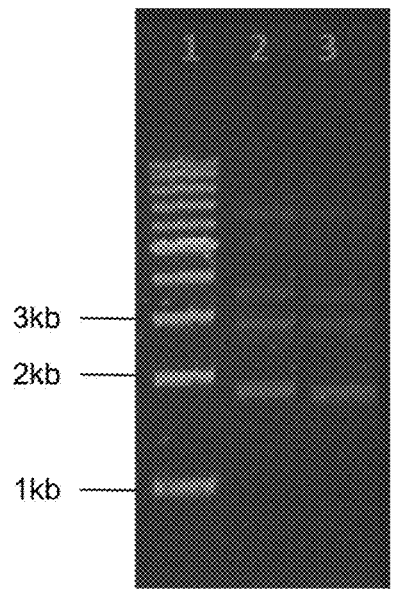
FIG. 18 shows a gel electropherogram for endonuclease activity assay of the modified Klenow fragment PR7: in lanes 1, 2 and 3 are a DNA molecule marker, a negative control, and PR7, respectively.
Figure 19:
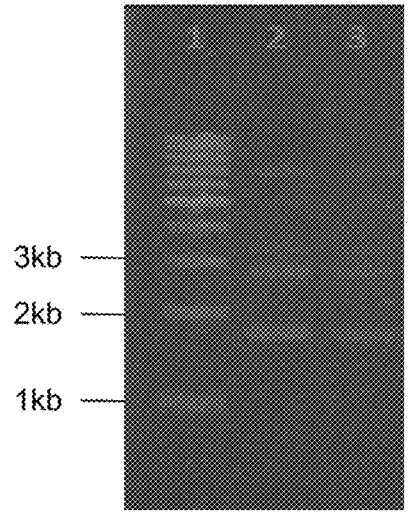
FIG. 19 shows a gel electropherogram for endonuclease activity assay of the modified Klenow fragment PR8: in lanes 1, 2 and 3 are a DNA molecule marker, a negative control, and PR8, respectively.
Figure 20:
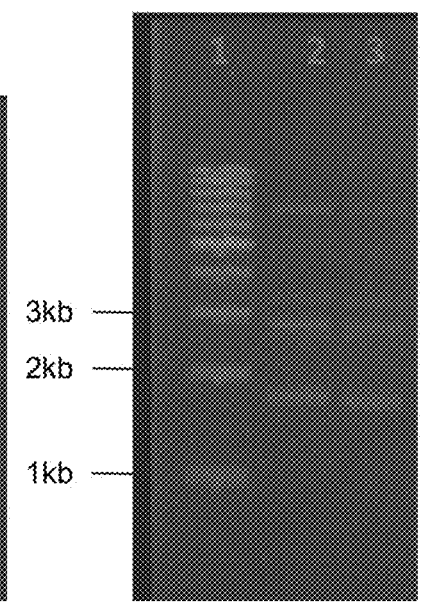
FIG. 20 shows a gel electropherogram for endonuclease activity assay of the modified Klenow fragment PR9: in lanes 1, 2 and 3 are a DNA molecule marker, a negative control, and PR9, respectively.

The present application is described below with reference to the specific examples and drawings. It is to be noted that these examples are intended to be illustrative only and are not to be construed as limiting the present application. The examples without a specified particular technique or condition are performed in accordance with techniques or conditions described in literatures in the art or in accordance with the product specification.

The reagents or instruments not provided with manufacturer are conventional and commercially available products.

In the specification, terms such as "one embodiment", "some embodiments", "one or some specific embodiments", "one or some examples", "exemplary" or the like, means that a particular feature, structure, material or characteristic described in reference to the embodiment or example is included in at least one embodiment or example of the present application. In the specification, the schematic description of the aforementioned terms do not necessarily refer to the same embodiment or example. Moreover, the specific features, materials, structures and other characteristics described may be combined in any one or more embodiments or examples in an appropriate manner. Moreover, various embodiments or examples and features of various embodiments or examples described in this specification can be combined by one skilled in the art to the extent that they do not contradict each other.

1. Preparation of Recombinant Bacteria 324-928aa of DNA polymerase I (UniPRotKB: P00582) is an amino acid fragment corresponding to the Klenow enzyme. The modified Klenow fragment in this example is one in which the N-terminus of the amino acid fragment of the Klenow enzyme has 1 tag sequence and a methionine, that is, the modified Klenow fragment is: methionine-tag sequence-amino acids at positions 324-928 of DNA polymerase I. The tag sequence consists of 12 amino acids: glycine-2 serines-6 histidines-2 serines-glycine (GSSHHHHHHSSG) (SEQ ID NO: 1), and corresponds to the nucleotide sequence: GGCAGCAGCCACCACCAC-CACCACCACAGCAGCGGT (SEQ ID NO: 2). Methionine corresponds to nucleotides ATG. The nucleotide sequence of the wild-type Klenow fragment in this example is identical to the nucleotide sequence corresponding to amino acids 324-928 of DNA polymerase I (UniPRotKB: P00582).

A gene encoding the modified Klenow fragment was synthesized, and the DNA fragment between the recognition sequences NcoI and XhoI of pET-28a (Novagen) was replaced with the modified Klenow fragment to obtain a recombinant vector, which was named V-PR. V-PR was introduced into E. coli BL21(DE3) (Tiangen Biotech (Beijing) Co., Ltd) to obtain a recombinant bacterium, which was named BL21-V-PR. BL21-V-PR expresses the modified Klenow fragment PR.

When the Klenow-encoding gene has no mutation, the Klenow fragment expressed by BL21-V-PR is PR0.

Nucleotide sequences comprising mutations in the Klenow-encoding gene region were synthesized. The modified Klenow fragments expressed by these codes are PR1, PR2, PR3, PR4, PR5, PR6, PR7, PR8 and PR9. The mutation sites and types in the modified Klenow fragments are shown in Table 1 below:

TABLE 1

| modified Klenow fragment | Mutation site corresponding to the site of DNA polymerase I | Mutation site corresponding to the site of fusion unit PR0 | Type of mutation | Type of nucleotide mutation |
|---|---|---|---|---|
| PR0 | None | None | None | None |
| PR1 | 762 | 452 | F762Y | TTC-TAT |
| PR2 | 842 | 532 | A842K | GCG-AAA |
| PR3 | 709 | 399 | I709K | ATC-AAA |
| PR4 | 603 | 293 | P603K | CCG-AAA |
| PR5 | 762, 842 | 452, 532 | F762Y, A842K | TTC-TAT, GCG-AAA |
| PR6 | 762, 842, 603 | 452, 532, 293 | F762Y, A842K, P603K | TTC-TAT, GCG-AAA, CCG-AAA |
| PR7 | 842, 709 | 532, 399 | A842K, I709K | GCG-AAA, ATC-AAA |
| PR8 | 762, 709 | 452, 399 | F762Y, I709K | TTC-TAT, ATC-AAA |
| PR9 | 762, 842, 709 | 452, 532, 399 | F762Y, A842K, I709K | TTC-TAT, GCG-AAA, ATC-AAA |

2. Preparation of Klenow Fragment PR 2.1 Induction of Expression

The recombinant bacteria BL21-V-PR obtained in step 1 were inoculated into 5 mL of a Kan-LB medium (a liquid medium with 50 g/mL kanamycin obtained by adding kanamycin to an LB medium) for culture at 37° C. and 220 rpm overnight; the resulting bacteria solution was inoculated into 30 mL of Kan-LB medium in a volume ratio of 1:50 for culture at 37° C. and 220 rpm for 4 h; the resulting bacteria solution was inoculated into 250 mL of Kan-LB medium in a volume ratio of 1:50 for culture at 37° C. and 220 rpm for 4 h. When OD600 reached about 0.6, IPTG (isopropyl D-D-thiogalactopyranoside) was added to the cultured bacterial solution until its final concentration was 0.5 mM. The resulting bacteria solution was cultured at 30° C. and 220 rpm overnight (about 16 h), and centrifuged at 8000 rpm for 10 min to collect BL21-V-PR bacteria. Meanwhile, a blank control with no IPTG added was set up so as to collect uninduced BL21-V-PR bacteria.

2.2 Disruption and Purification of Bacteria

BL21-V-PR bacteria of step 2.1 were resuspended in an affinity solution (50 mM Tris, 200 mM NaCl, 5% Glycerol, pH 7.5) in a bacteria-affinity solution ratio of 1 g:20 mL to obtain bacteria suspension 1, to which were then added phenylmethylsulfonyl fluoride, Triton X-100 and lysozyme to obtain bacteria suspension 2, with the final concentrations of phenylmethylsulfonyl fluoride, Triton X-100 and lysozyme being 0.25 mM, 0.5% (volume concentration) and 2.5 mg/100 mL, respectively. Bacteria suspension 2 was incubated at room temperature for 30 min, treated by sonication (40% power (about 400 W), 2 s of treatment followed by 2 s of resting, for a total of 30 min), and centrifuged at 12000 rpm and 4° C. for 30 min. The supernatant was collected.

The supernatant was filtered with a 0.45 μm syringe filter (Life Sciences) and then subjected to affinity chromatography (pre-packed column HisTrap HP, 5 mL, 17-5248-02, GE healthcare) on a Ni column, in which after the supernatant was loaded, the column was equilibrated with 10 CV of affinity buffer 1 (50 mM Tris, 200 mM NaCl, 10 mM imidazole, 5% Glycerol, PH 7.4), and eluted with 5 CV of 3% affinity buffer 2 (50 mM Tris, 1M NaCl, 500 mM imidazole, 5% Glycerol, PH 7.4) and then with 5 CV of 50% affinity buffer 2. Eluent corresponding to peaks greater than and equal to 100 mAU was collected.

The eluent corresponding to peaks greater than and equal to 100 mAU was dialyzed against ion buffer 1 (25 mM Tris, 50 mM NaCl, 5% Glycerol, PH 7.4) overnight. The dialyzed solution was subjected to cation exchange chromatography (pre-packed column HiTrap SP HP, 5 mL, 17-1152-01, GE healthcare), in which after the solution was loaded, the column was equilibrated with 10 CV of ion buffer 1, and eluted with 5 CV of 3% ion buffer 2 (50 mM Tris, 1M NaCl, 5% Glycerol, PH 7.40) and then with 5 CV of 50% ion buffer 2. Eluent corresponding to peaks greater than and equal to 100 mAU was collected, dialyzed against a dialysate (20 mM Tris, 200 mM KCl, 0.2 mM EDTA, 5% Glycerol) with a dialysis bag (spectrumlabs, 131267) for 24 h, and brought to 0.5 mg/mL with 50% glycerol contained. A purified Klenow fragment PR solution was thus obtained. The obtained Klenow fragment PRs were PR0, PR1, PR2, PR3, PR5, PR6, PR7, PR8 and PR9.

3. PR Protein Assay (1) SDS-PAGE Electrophoresis

20 μL of 1 mg/mL Klenow fragment PR obtained by step 2 was well mixed with 20 μL of a loading buffer (Sangon Biotech (Shanghai) Co., Ltd, C508321-0205) to obtain liquid 1; 10 μL of 0.05 mg/mL Klenow fragment PR obtained by step 2 was well mixed with 10 μL of the loading buffer to obtain liquid 2. 10 μL of each of liquid 1 and liquid 2 were subjected to SDS-PAGE electrophoresis, and the results are shown in FIG. 1. The purified modified Klenow fragment PR has a purity greater than 95%. The purities of the modified Klenow fragments PR1, PR2, PR3, PR4, PR5, PR6, PR7, PR8 and PR9 are all greater than 95%. Their results are shown in FIG. 2, FIG. 3, FIG. 4, FIG. 5, FIG. 6, FIG. 7, FIG. 8, FIG. 9 and FIG. 10, respectively.

(2) Endonuclease Activity Assay

The modified Klenow fragment PR obtained by step 2 was assayed for endonuclease activity using the reaction system of Table 2:

TABLE 2

| Reagent | Required amount |
| --- | --- |
| pUC19 | 500 ng |
| Modified Klenow fragment PR | 25 μL |
| Reaction buffer 1 | 5 μL |
| Making up to 50 μL with water | |

Reaction buffer 1: 10 mM Tris, 10 mM KCl, 1 mM $MgSO_4$, pH 7.4.

The reaction system of Table 2 was incubated at 37° C. for 4 h, and then quenched with 1 L of 0.5 M EDTA. The reaction product was purified using Gel Extraction Kit (omega bio-tek). The modified Klenow fragment PR was replaced with water as a negative control (NC). 1% agarose gel electrophoresis was then carried out. The pUC19 plasmid major band showed that pUC19 plasmids were not degraded, and the band is consistent with that of the gel electropherogram of the negative control, showing that the modified Klenow fragment PR was not polluted by endonuclease. All of PR0, PR1, PR2, PR3, PR4, PR5, PR6, PR7, PR8 and PR9 were not polluted by endonuclease. Their results are shown in FIG. 11, FIG. 12, FIG. 13, FIG. 14, FIG. 15, FIG. 16, FIG. 17, FIG. 18, FIG. 19 and FIG. 20, respectively.

(3) DNase Activity Assay

The DNase activity was assayed using the kit from Thermo Fisher Scientific under Cat. #AM1970M.

Experimental procedures: DNase Alert Substrate was resuspended in 1 mL of TE buffer (Thermo Fisher Scientific, Cat. #AM1970M), and the complete dissolution of the substrate was ensured. The resuspended DNase Alert Substrate was added to a 384-well plate at 5 μL per well. 40 μL of the modified Klenow fragment PR enzyme obtained by step 2 was added to the wells, and the mixture was well mixed. A negative control and a positive control were set up. The negative control was a solution obtained by replacing the modified Klenow fragment PR1 enzyme solution with equal volume of nuclease-free water. The positive control was obtained as follows: 10× Nuclease Alert Buffer (invitrogen) was 10-fold diluted with nuclease-free water to obtain 1× solution, which was used to 5-fold dilute the standard DNase I (Thermo Fisher Scientific, Cat. #AM1970M); 2.5 μL of the resulting dilution was added into positive control wells, followed by 37.5 μL of nuclease-free water to make up the system, which was well mixed by shaking.

After incubation at 37° C. for 10 min, detection was performed with a Gen5 microplate reader. The Dnase activity of the modified Klenow fragment PR was calculated to be 0.002 U/μL according to the detected fluorescence value, indicating no DNASE activity. The Dnase activities of PR1, PR2, PR3, PR4, PR5, PR6, PR7, PR8 and PR9 are 0.001 U/μL, 0.001 U/μL, 0.001 U/μL, 0.001 U/μL 0.002 U/μL, 0.002 U/μL, 0.001 U/μL, 0.001 U/μL and 0.002 U/μL, respectively.

4. DNA Polymerase Activity Assay of Modified Klenow Fragment PR Using dNTP as Substrate 20 μL of the modified Klenow fragment PR (0.5 mg/mL) obtained by step 2 was serially diluted 8-fold, 16-fold, 30-fold, 64-fold and 128-fold with an enzyme dilution buffer (20 mM pH 7.4 Tris and 100 mM KCl in a solvent of water) in a 96-well round bottom plate to finally obtain a 128-fold dilution of the modified Klenow fragment PR, which was then subjected to reaction in a reaction system of Table 3.

TABLE 3

| Components | Volume |
| --- | --- |
| annealed mixture | 2.5 μL |
| 10 mM dNTP | 1.25 μL |
| 128-fold dilution of the modified Klenow fragment PR | 3 μL |
| Reaction buffer 2 | 12.5 μL |
| H₂O | 5.75 μL |

Reaction buffer 2: 50 mM NaCl, 10 mM Tris-HCl, 10 mM $MgCl_2$, and 100 μg/mL BSA, pH 7.9, at 25° C. The components of the anealed texture in Table 3 and their proportions are shown in Table 4:

TABLE 4

| Components | Volume |
| --- | --- |
| 30 μM template | 2.5 μL |
| 30 μM primer | 2.5 μL |
| 2 × reaction buffer | 12.5 μL |
| H₂O | 7.5 μL |

$H_2O$ was used as a negative control, and the experiment was conducted in triplicate. The reaction system was incubated in a PCR amplifier at 37° C. for 30 min, then rapidly placed on ice, and quenched with 1 μL of 50 mM EDTA. The following were used: 2× reaction buffer: 10 mM Tris, 50 mM NaCl, pH 7.4; template: ATCT-GAGGACACGGCCGTGTATTACTGTGCGAAGAGCAT-TGCTGCATCCAGTTTGCAAAGT (SEQ ID NO: 3); and primer: TAGACTCCTGT (SEQ ID NO: 4).

After the reaction was completed, 2 μL of reaction mixture was added to a 96-well plate with 38 μL of LTE buffer added in advance, and the resulting mixture was pipetted to be well mixed. 10 μL of the mixture was then added to a black flat-bottom 96-well plate with 40 μL of LTE buffer added in advance. 500 ng/mL XDNA was serially diluted in other wells of the 96-well plate by the 2-fold method, and 50 μL of the dilution of each dilution gradient was used as a standard and added to a new well. After Picogreen (Thermo Fisher Scientific) dye was 200-fold diluted with TE buffer, and then 50 μL of the dilution was added into the sample wells. The resluting mixture was well mixed, and left standing in the dark at room temperature for 2 min. Fluorescence was detected under the conditions of 480 nm excitation light and 520 nm emission light. The amount of polymerized dNTP for the 128-fold diluted enzyme solution of PR0 was measured to be 0.21 nmol, and the amount of polymerized dNTP for PR1, PR2, PR3, BG8, PR5, PR6, PR7, PR8 and PR9 was 0.34 nmol, 0.22 nmol, 0.35 nmol, 0.26 nmol, 0.27 nmol, 0.28 nmol, 0.3 nmol, 0.28 nmol and 0.35 nmol, respectively. DNA polymerase activity ratio=ratio of the amount of polymerized dNTP detected, and the specific calculation results are shown in table 5:

TABLE 5

| | DNA polymerase activity ratio |
| --- | --- |
| PR1/PR0 | 1.62 |
| PR2/PR0 | 1.05 |
| PR3/PR0 | 1.67 |
| PR4/PR0 | 1.24 |
| PR5/PR0 | 1.29 |
| PR6/PR0 | 1.33 |
| PR7/PR0 | 1.43 |
| PR8/PR0 | 1.33 |
| PR9/PR0 | 1.67 |

The calculation results show that the polymerase activity of other PR mutants is improved compared to that of PR0.

5. Detection of Sequencing Effect

A synthesized known sequence was sequenced as a template using PR1, PR2, PR3, BG8, PR5, PR6, PR7, PR8, PR9 on a GenoCare™ sequencing platform. The control enzymes were the Klenow fragments of NEB™ (Cat. #M0407B) and VAZYME™ (N105-C1). The Genocare™ platform can be built by reference to the disclosure of CN201610209150.2, CN201710607295.2, and the sequencing can be performed by reference to the sequencing process in the article doi.org/10.1371/journal.pone.0188181 (Single molecule sequencing of the M13 virus genome without amplification). The synthesized known sequence is 5'-TATTGATTCTCAAACT-TACTCAAAATTAATTTTTAAATAACAT-TCTAACAAAATACCTCACTGGGT GCGGAAGAGAAAGAATAC-CATGCAGAAGGAGGCAAAGTA-3' (SEQ ID NO: 5). The flowcell probe used for sequencing in this example is 5'-TACTTTGCCTCCTTCTGCATGGTAT-TCTTTCTCTTCCGCACCCAG-3' (SEQ ID NO: 6), with the 5' end immobilized on the flowcell and linked to FAM fluorescence.

The sequencing was performed as follows:
1) the template was hybridized with the flowcell probe;
2) the fluorescence-labeled dNTP and Klenow enzyme were added into the flowcell, wherein the dNTP was stored in a buffer I to form a nucleotide solution, wherein the buffer I consists of 20 mM Tris-HCl, pH 8.8, 10 mM $MgSO_4$, 10 mM $(NH_4)_2SO_4$, 10 mM HCl, and 0.1% Triton X-100; 100U of the Klenow fragment was added into the flowcell; and
3) the sequencing was performed at 37° C.

To exclude the effect of the flowcell on the experimental results, sequencing assays were performed using the Klenow enzyme and the control enzyme of this example on the same flowcell.

The experimental results are as follows: The sequencing capacity of the modified Klenow fragment was analyzed by comparing the sequencing results with those of the Klenow fragments of NEB™ and VAZYME™.

In this example, each enzyme was subjected to multiple (three or more) parallel sequencings, and the average read length herein refers to the arithmetic average value of the sequencing read lengths obtained after the corresponding enzyme was subjected to multiple parallel sequencings. FIGS. 21-29 present part of the sequencing results.

Figure 21:
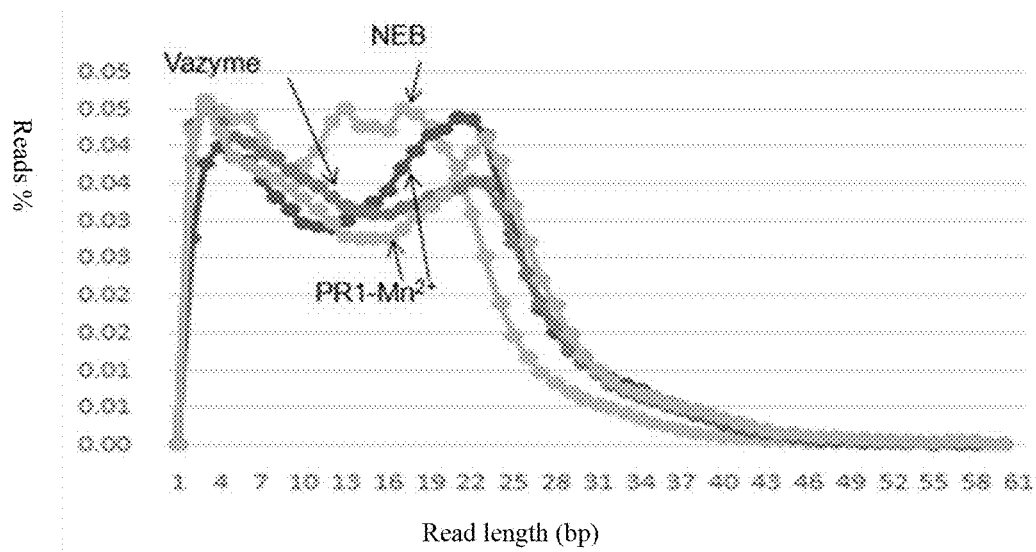
FIG. 21 shows a comparison of sequencing results of PR1-$Mn^{2+}$ ($Mg^{2+}$ is replaced with $Mn^{2+}$ in PR1 sequencing buffer), NEB™ enzyme and VAZYME™ enzyme.

For example, in the sequencing experiment of PR1, PR1 was subjected to 3 parallel sequencings and an average read length of the 3 sequencings was calculated. Similarly, the Klenow fragments of PR1-$Mn^{2+}$ and NEB™ were each subjected to 3 parallel sequencings and an average read length for each enzyme was calculated. The curves in FIG. 21 are only part of the sequencing results, and FIG. 21 specifically presents the results of VAZYME™ from one of the sequencings, the results of NEB™ from one of the sequencings, and the results of PR1-Mn$^{2+}$ from two of the sequencings.

PR1: PR1 shows better sequencing effect in a Mn$^{2+}$-containing solution than in a Mg$^{2+}$-containing solution, PR1 shows better sequencing effect in a Mn$^{2+}$-containing solution than the Klenow fragments of NEB™ and VAZYME™, with the average read length being 1.17 times and 1.36 times that obtained using the latter two enzymes, respectively. The specific sequencing results are shown in FIG. 21, where the abscissa represents the sequencing read length and the ordinate represents the percentage of the number of each sequencing read length to the total number of all sequencing read lengths; PR1-Mn$^{2+}$: the sequencing results of PR1 in a Mn$^{2+}$-containing sequencing buffer, wherein Mn$^{2+}$ has a concentration of 5 mM, and the sequencing buffer is a solution obtained by replacing the 10 mM MgSO$_4$ in buffer I with 2 mM MnSO$_4$; NEB™: the sequencing results of the Klenow fragment of NEB™; VAZYME™: the sequencing results of the Klenow fragment of VAZYME™.

Figure 22:
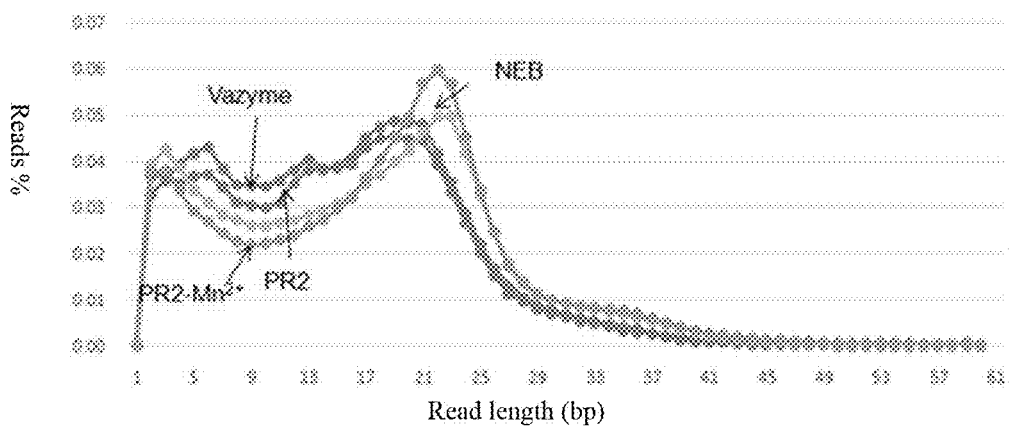
FIG. 22 shows a comparison of sequencing results of PR2, PR2-$Mn^{2+}$ ($Mg^{2+}$ is replaced with $Mn^2$ in PR2 sequencing buffer), NEB™ enzyme and VAZYME™ enzyme.

PR2:

PR2 shows better sequencing effect in a Mn$^{2+}$-containing buffer than the Klenow fragments of NEB™ and VAZYME™, with the sequencing average read length being 1.03 times and 1.04 times that obtained using the latter two enzymes, and PR2 shows better sequencing effect in a Mn$^{2+}$-containing buffer than in a Mg$^{2+}$-containing buffer. The specific sequencing results are shown in FIG. 22, where the abscissa represents the sequencing read length, and the ordinate represents the percentage of the number of each sequencing read length to the total number of all the sequencing read lengths; PR2: the sequencing results of PR2 in buffer I; PR2-Mn$^{2+}$: the sequencing results of PR2 in a Mn$^{2+}$-containing sequencing buffer, wherein Mn$^{2+}$ $^2$ has a concentration of 0.5 mM, and the sequencing buffer is a solution obtained by replacing the 10 mM MgSO$_4$ in buffer I with 5 mM MnSO$_4$; NEB™: the sequencing results of the Klenow fragment of NEB™; VAZYME™: the sequencing results of the Klenow fragment of VAZYME™.

Figure 23:
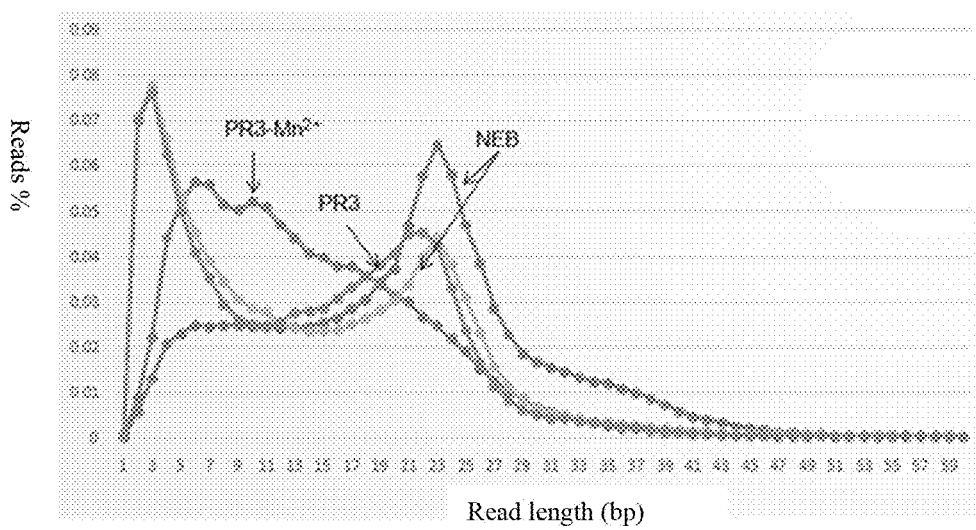
FIG. 23 shows a comparison of sequencing results of PR3, PR3-$Mn^{2+}$ ($Mg^{2+}$ is replaced with $Mn^{2+}$ in PR3 sequencing buffer) and NEB™ enzyme.

PR3: Sequencing results of PR3: sequencing was performed using PR3 in a Mn$^{2+}$-containing sequencing buffer, and the results show that the sequencing read lengths extensively stagnates at short fragments; sequencing was performed using PR3 in buffer I, and the results show that the average read length obtained is comparable to that obtained using the Klenow fragment of NEB™, with the former being 1.01 times the latter. In addition, PR3 was found to be effective in reducing the BRR in the sequencing results, which is 0.65 times that in the sequencing results of the Klenow fragment of NEB™. The specific sequencing results are shown in FIG. 23, where the abscissa represents the sequencing read length, and the ordinate represents the percentage of the number of each read length to the total number of all sequencing read lengths; PR3: the sequencing results of PR3 in buffer I; NEB™: the sequencing results of the Klenow fragment of NEB™; PR3-Mn$^{2+}$: the sequencing results of PR3 in a Mn$^{2+}$-containing sequencing buffer, wherein Mn$^{2+}$ has a concentration of 5 mM, and the sequencing buffer is a solution obtained by replacing the 10 mM MgSO$_4$ in buffer I with 5 mM MnSO$_4$.

Figure 24A:
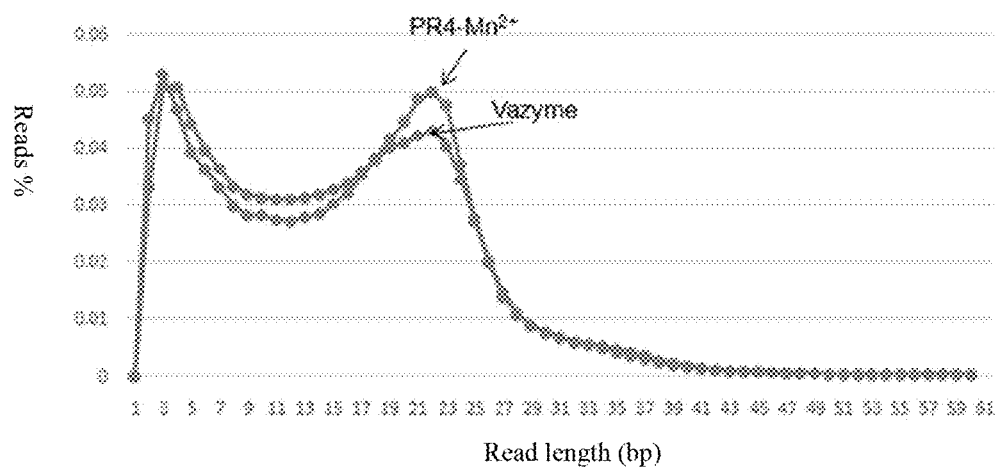
FIG. 24-A shows a comparison of sequencing results of PR4-$Mn^{2+}$ ($Mg^{2+}$ is replaced with $Mn^{2+}$ in PR4 sequencing buffer), and NEB™ enzyme.
FIG. 24B shows a comparison of sequencing results of PR4 and VAZYME™ enzyme.
Figure 24B:
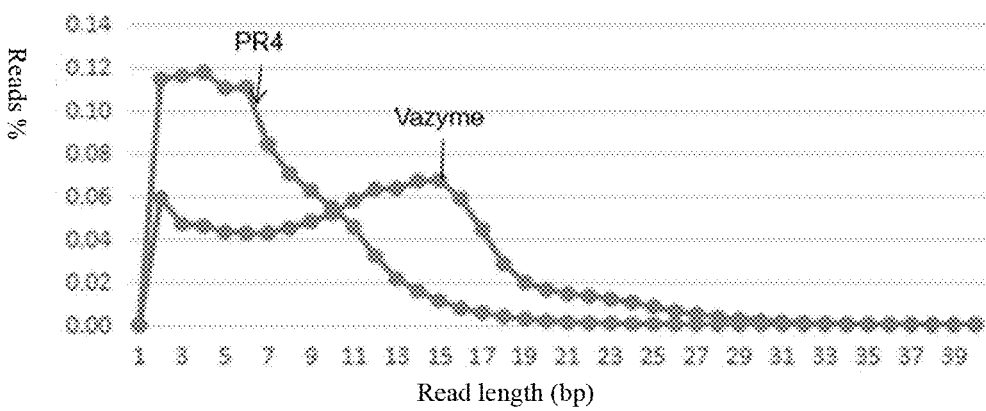
Figure 25:
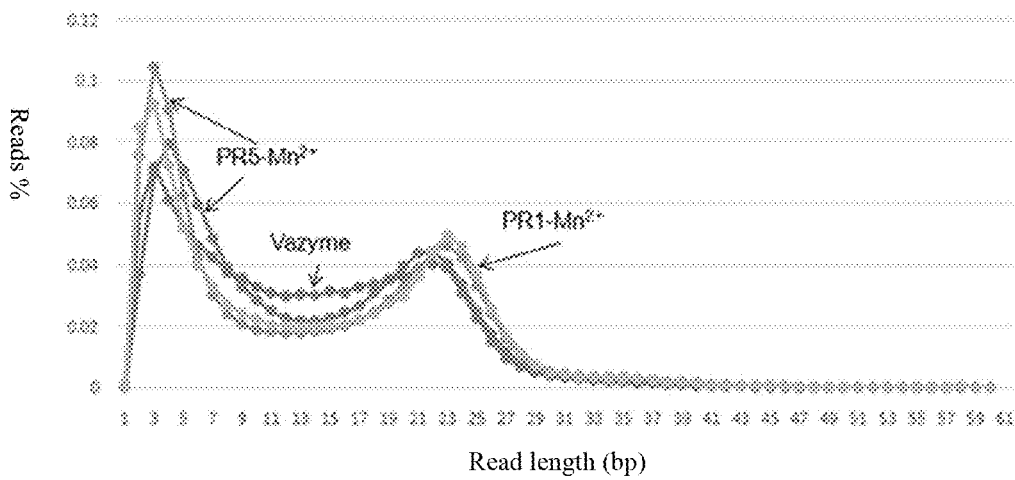
FIG. 25 shows a comparison of sequencing results of PR5-$Mn^{2+}$ ($Mg^{2+}$ is replaced with $Mn^{2+}$ in PR5 sequencing buffer), PR1-$Mn^{2+}$ ($Mg^{2+}$ is replaced with $Mn^{2+}$ in PR1 sequencing buffer) and VAZYME™ enzyme.
Figure 26:
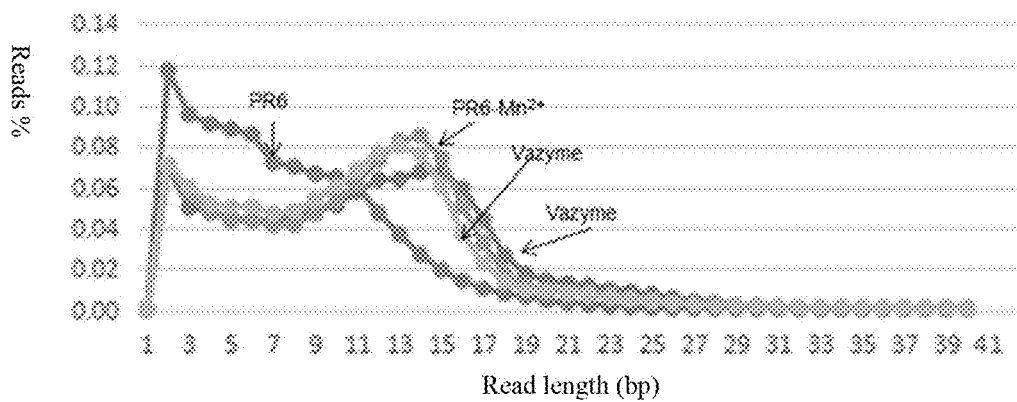
FIG. 26 shows a comparison of sequencing results of PR6, PR6-$Mn^{2+}$ ($Mg^{2+}$ is replaced with $Mn^{2+}$ in PR6 sequencing buffer) and VAZYME™ enzyme.
Figure 27A:
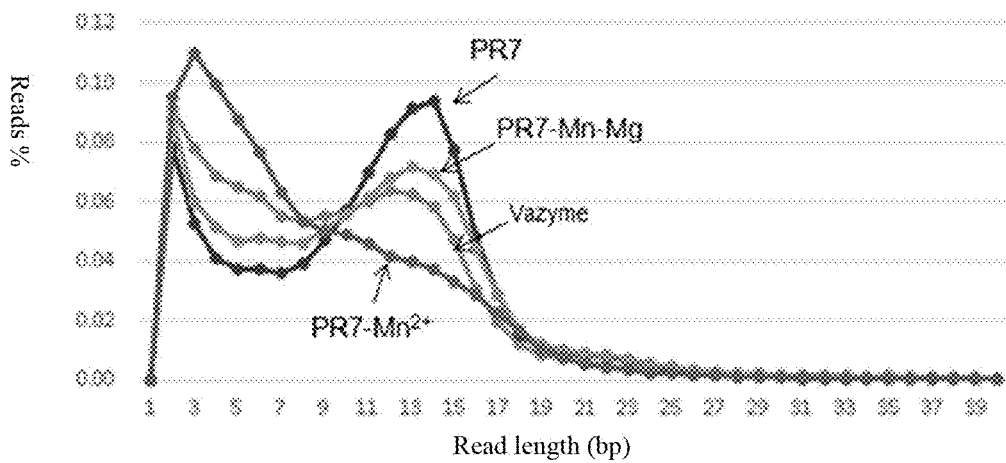
FIG. 27A shows a comparison of sequencing results of PR7 under different reaction conditions and VAZYME™ enzyme.
Figure 27B:
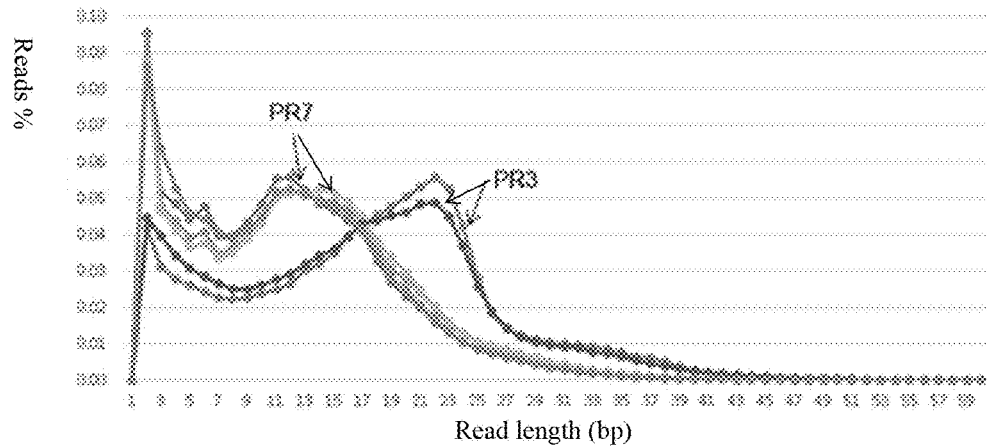
FIG. 27B shows a comparison of sequencing results of PR7 and PR3.

PR4:

The sequencing results of PR4 were compared with those of the Klenow fragment of VAZYME™, showing that the average read length obtained using PR4 in sequencing in buffer I stagnates at short fragments; the average read length obtained using PR4 in sequencing in a Mn$^{2+}$-containing buffer and the BRR in the sequencing results are comparable to those obtained using the Klenow fragment of VAZYME™. The average read length obtained using PR4 in sequencing in a Mn$^{2+}$-containing buffer is 1.07 times that obtained using the Klenow fragment of Vazyme™. The specific sequencing results are shown in FIGS. 24A and 24B, where the abscissa represents the sequencing read length and the ordinate represents the percentage of the number of each read length to the total number of all sequencing read lengths; PR4-Mn$^{2+}$: the sequencing results of PR4 in a Mn$^{2+}$-containing sequencing buffer, wherein Mn$^{2+}$ has a concentration of 5 mM, and the sequencing buffer is a solution obtained by replacing the 10 mM MgSO$_4$ in buffer I with 5 mM MnSO$_4$; PR4: the sequencing results of PR4 in buffer I; VAZYME™: the sequencing results of the Klenow fragment of VAZYME™.

PR5:

The sequencing results obtained using PR5 in sequencing in a Mn$^{2+}$-containing buffer were compared with those obtained using PR1 and the Klenow fragment of VAZYME™, showing that the BRR in the sequencing results of PR5 is lower than those of PR1 and the Klenow fragment of VAZYME™, and the average read length obtained using PR5 is comparable to that obtained using the Klenow fragment of VAZYME™. The specific sequencing results are shown in Table 6 and FIG. 25, where the abscissa represents the sequencing read length and the ordinate represents the percentage of the number of each read length to the total number of all sequencing read lengths; PR1: the sequencing results of PR1 in buffer I; PR5-Mn$^{2+}$: the sequencing results in a Mn$^{2+}$-containing sequencing buffer, wherein Mn$^{2+}$ has a concentration of 5 mM, and the sequencing buffer is a solution obtained by replacing the 10 mM MgSO$_4$ in buffer I with 1 mM MnSO$_4$; VAZYME™: the sequencing results of the Klenow fragment of VAZYME™.

TABLE 6

| | PR5-Mn$^{2+}$/PR1 | PR5-Mn$^{2+}$/Vazyme ™ |
|---|---|---|
| BRR | 0.78 | 0.96 |
| Average length | 0.96 | 1 |

PR6:

The sequencing results of PR6 were compared with those of the Klenow fragment of VAZYME™, showing that the average read length obtained using PR6 in sequencing in buffer I stagnates at short fragments; the average read length obtained using PR6 in sequencing in a Mn$^{2+}$-containing buffer is comparable to that obtained using the Klenow fragment of VAZYME™, and the BRR in the sequencing results of PR6 is 0.82 times that of the Klenow fragment of VAZYME™. The specific sequencing results are shown in Table 7 and FIG. 26, where the abscissa represents the sequencing read length and the ordinate represents the percentage of the number of each read length to the total number of all sequencing read lengths; PR6: the sequencing results of PR1 in buffer I; PR6-Mn$^{2+}$: the sequencing results of PR6 in a Mn$^{2+}$-containing sequencing buffer, wherein Mn$^{2+}$ $^2$ has a concentration of 5 mM, and the sequencing buffer is a solution obtained by replacing the 10 mM MgSO$_4$ in buffer I with 5 mM MnSO$_4$; VAZYME™: the sequencing results of the Klenow fragment of VAZYME™.

TABLE 7

|  | PR6/Vazyme ™ | PR6-Mn²⁺/Vazyme ™ |
| --- | --- | --- |
| BRR | 0.99 | 0.82 |
| Average length | 0.67 | 1.04 |

TABLE 8

|  | PR7/ Vazyme ™ | PR7/ PR3 | PR7-Mn/ Vazyme ™ | PR7-Mn—Mg/ Vazyme ™ |
| --- | --- | --- | --- | --- |
| BRR | 0.44 | 0.97 | 0.78 | 1.18 |
| Average length | 1.15 | 0.73 | 0.89 | 1.12 |

PR7:

The results of several batches of experiments with PR7 and PR3 were compared and analyzed, and the sequencing results of PR7 and the Klenow fragment of VAZYME™ were compared. When the sequencing buffer is buffer I, the sequencing average read length in the sequencing results of PR7 is 1.15 times that obtained using the Klenow fragment of VAZYME™, and is shorter than that in the sequencing results of PR3; the BRR in the sequencing results of PR7 is lower than those of the Klenow fragment of VAZYME™ and PR3. Under conditions of different buffers, PR7 has different amplification capacities, with the best amplification capacity in the presence of $Mg^{2+}$, and the sequencing read lengths in the sequencing results stagnate at short fragments in the presence of $Mn^{2+}$ and the absence of $Mg^{2+}$; besides, amplification can be effectively performed using PR7 in the simultaneous presence of $Mn^{2+}$ and $Mg^{2+}$, with the average read length obtained by sequencing being 1.12 times that obtained using the Klenow fragment of Vazyme™. The specific sequencing results are shown in Table 8 and FIGS. 27A and 27B, where the abscissa represents the sequencing read length and the ordinate represents the percentage of the number of each read length to the total number of all sequencing reads; PR7, PR7-$Mn^{2+}$ and PR7-Mn-Mg indicate the sequencing results of PR7 in different sequencing buffers; PR7: the sequencing results of PR7 in buffer I; PR7-$Mn^{2+}$: the sequencing results of PR7 in a $Mn^{2+}$-containing sequencing buffer, wherein the sequencing buffer is a solution obtained by replacing the 10 mM $MgSO_4$ in buffer I with $MnSO_4$, and $Mn^2$ has a concentration of 5 mM; PR7-Mn-Mg: the sequencing results of PR7 in a $Mn^2$ and $Mg^{2+}$-containing sequencing buffer, wherein the sequencing buffer is a solution obtained by reducing the concentration of $MgSO_4$ in buffer I from 10 mM to 5 mM, with $MnSO_4$ having a concentration of 2 mM and the other components being the same as in buffer I; Vazyme™: the sequencing results of the Klenow fragment of VAZYME™.

PR8:

Sequencing can be effectively performed using PR8 in buffer I, and the average read length in the sequencing results of PR8 is 9.43, which is shorter than that obtained using the Klenow fragment of VAZYME™. In addition, when sequencing is performed using PR8 in a $Mn^{2+}$-containing solution, the sequencing read length stagnates at short fragments.

Figure 28:
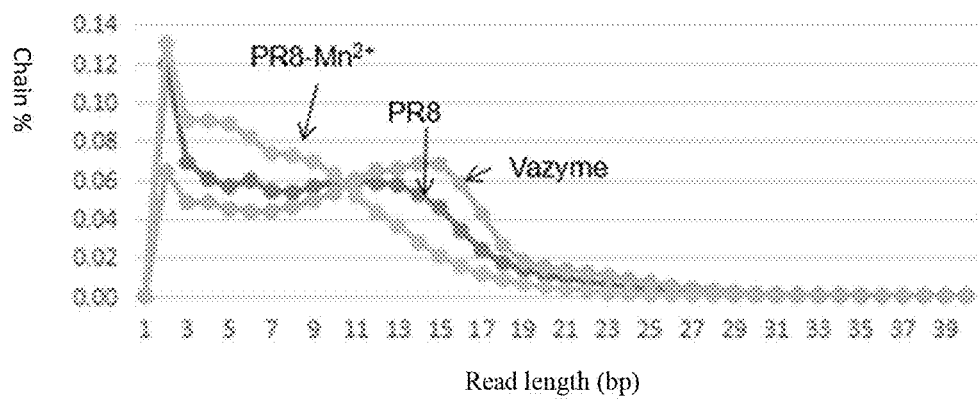
FIG. 28 shows a comparison of sequencing results of PR8, PR8-Mn$^{2+}$ (Mg$^{2+}$ is replaced with Mn$^{2+}$ in PR8 sequencing buffer) and VAZYME™ enzyme.

The specific sequencing results are shown in FIG. 28, where the abscissa represents the sequencing read length and the ordinate represents the percentage of the number of each read length to the total number of all sequencing read lengths; PR8: the sequencing results of PR8 in buffer I; PR8-$Mn^{2+}$: the sequencing results of PR8 in a $Mn^{2+}$-containing sequencing buffer, wherein $Mn^{2+}$ has a concentration of 1 mM, and the sequencing buffer is a solution obtained by replacing the 10 mM $MgSO_4$ in buffer I with 5 mM $MnSO_4$; VAZYME™: the sequencing results of the Klenow fragment of VAZYME™.

Figure 29:
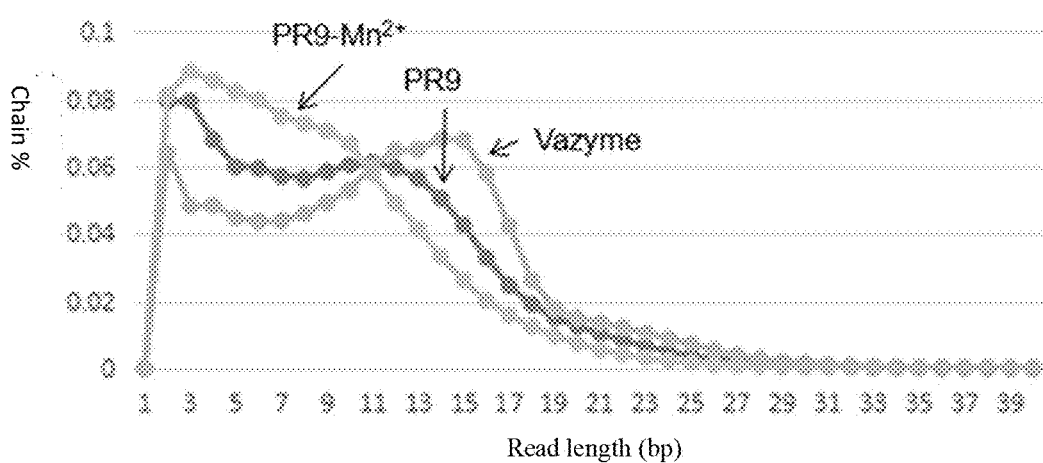
FIG. 29 shows a comparison of sequencing results of PR9, PR9-Mn$^{2+}$ (Mg$^{2+}$ is replaced with Mn$^{2+}$ in PR8 sequencing buffer) and VAZYME™ enzyme.

PR9:

When sequencing is performed using PR9 in a $Mn^{2+}$-containing solution, the sequencing read lengths stagnate at short fragments; the average read length in the sequencing results of PR9 is 10.59, which is shorter than that obtained using the Klenow fragment of VAZYME™. Sequencing can be effectively performed using PR9 in buffer I. The specific sequencing results are shown in FIG. 29, where PR9-$Mn^{2+}$: the sequencing results of G33 in a $Mn^{2+}$-containing sequencing buffer, wherein $Mn^{2+}$ has a concentration of 5 mM, and the sequencing buffer is a solution obtained by replacing the 10 mM $MgSO_4$ in buffer I with 5 mM $MnSO_4$; PR9: the sequencing results of PR9 in buffer I; VAZYME™: the sequencing results of the Klenow fragment of VAZYME™.

Although embodiments of the present application are illustrated and described above, it will be appreciated that the above embodiments are exemplary and not to be construed as limiting the present application, and that changes, modifications, substitutions and alterations can be made to the above embodiments by those of ordinary skill in the art within the scope of the present application.

What is claimed is:

1. A modified Klenow fragment comprising at least amino acids 324-928 from E. coli DNA Polymerase 1, except that said fragment further possesses substitution mutations selected from the group consisting of: A842K, A842H, A842R, I709K, I709H, I709R, P603K and combinations thereof, and optionally, further possesses a substitution at F762Y.

2. The modified Klenow fragment according to claim 1, wherein said fragment possesses substitution mutations selected from the group consisting of F762Y+A842K; P603K; and F762Y+A842K+P603K.

3. The modified Klenow fragment according to claim 1, wherein said fragment possesses a substitution mutation selected from the group consisting of A842K, A842H, and A842R.

4. The modified Klenow fragment according to claim 1, wherein said fragment possesses a substitution mutation(s) selected from the group consisting of: I709K, I709H, or I709R: A842K+I709K: F762Y+A842K+I709K.

5. The modified Klenow fragment according to claim 1, wherein at least one end of the amino acid sequence of the modified Klenow fragment has an amino acid tag that is less than 12 amino acids in length.

6. The modified Klenow fragment according to claim 5, wherein the amino acid tag is located at the N-terminus of the amino acid sequence of the modified Klenow fragment.

7. The modified Klenow fragment according to claim 6, wherein the amino acid tag comprises 6-10 histidine residues.

8. The modified Klenow fragment according to claim 6, wherein the amino acid tag comprises GSSHHHHHHSSG (SEQ ID NO:1) or HHHHHHHHHH (SEQ ID NO:7).

9. A method for incorporating nucleotides into DNA, comprising interaction among (a) the modified Klenow fragment according to claim 1 or a mixture of the modified Klenow fragments according to claim 1, (b) DNA and (c) a nucleotide solution.

10. The method according to claim 9, wherein (c) the nucleotide solution contains $Mg^{2+}$, or $Mn^{2+}$, or $Mg^{2+}$ and $Mn^{2+}$.

11. The method according to claim 10, wherein (a) the modified Klenow fragment possesses substitution mutation(s) selected from the group consisting of: A842K, A842H, or A842R; I709K, I709H or I709R; A842K+I709K; F762Y+A842K+I709K; and F762Y+I709K: and (c) the nucleotide solution contains $Mg^{2+}$ at a concentration of 5-10 mM but no $Mn^{2+}$.

12. The method according to claim 10, wherein (a) the modified Klenow fragment possesses substitution mutation(s) selected from the group consisting of: F762Y+A842K: P603K; F762Y+A842K+P603K; and A842K, A842H, or A842R: and (c) the nucleotide solution contains $Mn^{2+}$ at a concentration of 0.1-5 mM but no $Mg^{2+}$.

13. The method according to claim 10, wherein (a) the modified Klenow fragment or the mixture of the modified Klenow fragments comprises substitution mutations functionally equivalent to A842K and I709K, and (c) the nucleotide solution contains $Mg^{2+}$ and $Mn^{2+}$, wherein the $Mg^{2+}$ has a concentration of 5-10 mM, and the $Mn^{2+}$ has a concentration of 0.1-5 mM.

14. A kit for incorporating nucleotides into DNA, comprising the modified Klenow fragment according to claim 1.

15. The kit according to claim 14, wherein the kit further comprises a nucleotide solution.

16. The kit according to claim 15, wherein the nucleotide solution contains nucleotides labeled with a fluorescent molecule.

17. The kit according to claim 14, further comprising a nucleotide solution, wherein the modified Klenow fragment possesses substitution mutation(s) selected from the group consisting of: A842K, A842H or A842R: I709K, I709H or I709R: A842K+I709K: F762Y+A842K+I709K; and F762Y+I709K: and wherein the nucleotide solution contains $Mg^{2+}$ at a concentration of 5-10 mM but no $Mn^{2+}$.

18. The kit according to claim 14, further comprising a nucleotide solution, wherein the modified Klenow fragment possesses substitution mutation(s) selected from the group consisting of: F762Y; F762Y+A842K; P603K; F762Y+A842K+P603K; and A842K, A842H, or A842R and wherein the nucleotide solution contains $Mn^{2+}$ at a concentration of 0.1-5 mM but no $Mg^{2+}$.

19. The kit according to claim 14, further comprising a nucleotide solution, wherein the modified Klenow fragment possesses the substitution mutation(s) A842K and I709K, and wherein the nucleotide solution contains $Mg^{2+}$ at a concentration of 5-10 mM and $Mn^{2+}$ at a concentration of 0.1-5 mM $Mg^{2+}$.

* * * * *

SEQUENCE LISTING

```
<160> NUMBER OF SEQ ID NOS: 7

<210> SEQ ID NO 1
<211> LENGTH: 12
<212> TYPE: PRT
<213> ORGANISM: Artificial Sequence
<220> FEATURE:
<221> NAME/KEY: misc_feature
<222> LOCATION: (1)..(12)
<223> OTHER INFORMATION: index
<220> FEATURE:
<221> NAME/KEY: metal
<222> LOCATION: (4)..(9)

<400> SEQUENCE: 1

Gly Ser Ser His His His His His His Ser Ser Gly
1               5                   10
```

<210> SEQ ID NO 2
<211> LENGTH: 36
<212> TYPE: DNA
<213> ORGANISM: Artificial Sequence
<220> FEATURE:
<221> NAME/KEY: misc_feature
<222> LOCATION: (1)..(36)
<223> OTHER INFORMATION: the nucleotide sequence used to encode SEQ ID
      NO: 1

<400> SEQUENCE: 2
ggcagcagcc accaccacca ccaccacagc agcggt                                 36

<210> SEQ ID NO 3
<211> LENGTH: 61
<212> TYPE: DNA
<213> ORGANISM: Artificial Sequence
<220> FEATURE:
<221> NAME/KEY: misc_feature
<222> LOCATION: (1)..(61)
<223> OTHER INFORMATION: Template

<400> SEQUENCE: 3
atctgaggac acggccgtgt attactgtgc gaagagcatt gctgcatcca gtttgcaaag       60
t                                                                      61

<210> SEQ ID NO 4
<211> LENGTH: 11
<212> TYPE: DNA
<213> ORGANISM: Artificial Sequence
<220> FEATURE:
<221> NAME/KEY: misc_feature
<222> LOCATION: (1)..(11)
<223> OTHER INFORMATION: Primer

<400> SEQUENCE: 4
tagactcctg t                                                           11

<210> SEQ ID NO 5
<211> LENGTH: 105
<212> TYPE: DNA
<213> ORGANISM: Artificial Sequence
<220> FEATURE:
<221> NAME/KEY: misc_feature
<222> LOCATION: (1)..(105)
<223> OTHER INFORMATION: Synthesized Sequence

<400> SEQUENCE: 5
tattgattct caaacttact caaaattaat ttttaaataa cattctaaca aaatacctca       60
ctgggtgcgg aagagaaaga ataccatgca gaaggaggca aagta                     105

<210> SEQ ID NO 6
<211> LENGTH: 45
<212> TYPE: DNA
<213> ORGANISM: Artificial Sequence
<220> FEATURE:
<221> NAME/KEY: misc_feature
<222> LOCATION: (1)..(65)
<223> OTHER INFORMATION: Probe

<400> SEQUENCE: 6
tactttgcct ccttctgcat ggtattcttt ctcttccgca cccag                      45

<210> SEQ ID NO 7
<211> LENGTH: 10

```
<212> TYPE: PRT
<213> ORGANISM: Artificial Sequence
<220> FEATURE:
<221> NAME/KEY: Metal
<222> LOCATION: (1)..(10)
<223> OTHER INFORMATION: Tag sequence

<400> SEQUENCE: 7

His His His His His His His His His
1               5                   10
```